(12) United States Patent
Spampinato et al.

(10) Patent No.: US 8,090,199 B2
(45) Date of Patent: Jan. 3, 2012

(54) REDUCTION OF COLOR BLEEDING EFFECTS IN A DIGITALLY PROCESSED IMAGE

(75) Inventors: Giuseppe Spampinato, Catania (IT); Alfio Castorina, Linera (IT); Arcangelo Ranieri Bruna, San Cataldo (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1016 days.

(21) Appl. No.: 12/002,886

(22) Filed: Dec. 18, 2007

(65) Prior Publication Data

US 2008/0181495 A1    Jul. 31, 2008

(30) Foreign Application Priority Data

Dec. 22, 2006    (IT) .............................. VA2006A0082

(51) Int. Cl.
*G06K 9/00* (2006.01)
*G06K 9/36* (2006.01)

(52) U.S. Cl. ...................................................... 382/167

(58) Field of Classification Search .................. 382/162, 382/164, 165, 167, 264, 266; 348/234, 252, 348/253, 625, 629, 631, E5.077, E9.01, E9.042; 358/3.03, 515, 518, 521, 530, 540; 345/596
See application file for complete search history.

(56) References Cited

U.S. PATENT DOCUMENTS

| | | | | |
|---|---|---|---|---|
| 5,047,844 A * | 9/1991 | Ikeda et al. | ................... | 358/521 |
| 5,418,574 A * | 5/1995 | Miyabata et al. | ............. | 348/625 |
| 6,254,669 B1 * | 7/2001 | Lavery et al. | .............. | 106/31.47 |
| 6,697,107 B1 * | 2/2004 | Hamilton et al. | ............. | 348/234 |
| 6,977,663 B2 * | 12/2005 | Chang | .......................... | 345/596 |
| 7,717,990 B2 * | 5/2010 | Ryu et al. | .................... | 106/31.47 |
| 2008/0181495 A1 * | 7/2008 | Spampinato et al. | ......... | 382/167 |
| 2010/0111413 A1 * | 5/2010 | Tsutsumi | ...................... | 382/167 |

OTHER PUBLICATIONS

Averbuch et al., "Deblocking of Block-Transform Compressed Images Using Weighted Sums of Symmetrically Aligned Pixels," *IEEE Transactions on Image Processing* 14(2): 33 pages, 2005.
Coudoux et al., "An Adaptive Postprocessing Technique for the Reduction of Color Bleeding in DCT-Coded Images," *IEEE Transactions on Circuits and Systems for Video Technology* 14(1):114-121, Jan. 2004.
Coudoux et al., "A DCT-Domain Postprocessor for Color Bleeding Removal," *Proceedings of the 2005 European Conference on Circuit Theory and Design*, Aug. 28-Sep. 2, 2005, 4 pages.
International Organization for Standardization, Coding of Moving Pictures and Audio, ISO/IEC JTC1/SC29/WG11 N2502, Final Draft of International Standard, Atlantic City, Oct. 1998, 343 pages.

(Continued)

*Primary Examiner* — Amir Alavi
(74) *Attorney, Agent, or Firm* — Lisa K. Jorgenson; Timothy L. Boller; Seed IP Law Group PLLC

(57) ABSTRACT

A method of processing digital images to reduce the effects of color bleeding. Chrominance components for pixels in a working window are determined and weights are assigned to the pixels in the working window. A chrominance correction for a center pixel in the working window is generated based on the chrominance components and the assigned weights. Fuzzy variables and thresholds may be applied to generate the assigned weights and the chrominance correction.

35 Claims, 18 Drawing Sheets
(15 of 18 Drawing Sheet(s) Filed in Color)

OTHER PUBLICATIONS

International Telecommunication Union, "Information Technology—Digital Compression and Coding of Continuous-Tone Still Images—Requirements and Guidelines," CCITT Recommendation T.81, Sep. 1992, 186 pages.

International Telecommunication Union, "Video Coding for Low Bitrate Communication," Draft ITU-T Recommendation H.263, May 2, 1996, 58 pages.

ISO/ISO 13818-2: 1995 (E), Recommendation ITU-T H.262 (1995 E), Draft International Standard, 1995, 255 pages.

Meier et al., "Reduction of Blocking Artifacts in Image and Video Coding," *IEEE Transactions on Circuits and Systems for Video Technology* 9(3):490-500, Apr. 1999.

Pennebaker et al., *JPEG: Still Image Data Compression Standard*, Van Nostrand Reinhold, New York, NY, 1993. [Book Submitted Herewith].

Rabbani et al., *Digital Image Compression Techniques*, SPIE Optical Engineering Press, Bellingham, WA, 1991. [Book Submitted Herewith].

Shen et al., "Review of Postprocessing Techniques for Compression Artifact Removal," *Journal of Visual Communication and Image Representation* 9(1):2-14, 1998.

Yang et al., "Maximum-Likelihood Parameter Estimation for Image Ringing-Artifact Removal," *IEEE Transactions on Circuits and Systems for Video Technology* 11(8):963-973, Aug. 2001.

Yuen et al., "A survey of hybrid MC/DPCM/DCT video coding distortions," *Signal Processing* 70:247-278, 1998.

* cited by examiner

REDUCTION OF COLOR BLEEDING EFFECTS IN A DIGITALLY PROCESSED IMAGE

BACKGROUND

1. Technical Field

This disclosure relates to methods of processing digital images and more particularly to methods of processing a digital image for reducing color bleeding effects.

2. Description of the Related Art

Common artifacts introduced by compression algorithms of static or video images based on the discrete cosine transform (DCT) include the so-called block and ringing artifacts. Block artifacts stem from the fact that compression schemes process blocks of an image and consist in visible discontinuities at borders between adjacent blocks. Ringing artifacts consist in distortions and erroneous displaying of borders of objects of the displayed scene.

Both kinds of artifacts occur because a relevant amount of information, carried by the DCT coefficients, is lost in quantization. Block compression plays a role even in the so-called color bleeding.

Color bleedings are distortions of the original image that are present in static images and in the images of video sequences, in the form of color blurring between zones of strong chromatic contrast.

Let us refer to FIG. 1 for better understanding the causes of this phenomenon. The chrominance values of the sixteen input pixels to be processed (FIG. 1a) are decimated with a ratio 2:1 and quantized (FIG. 1b) for obtaining a compressed image. In order to reconstruct an uncompressed image, the pixels of the image of FIG. 1b are dequantized (FIG. 1c) and then interpolated (FIG. 1d).

Chrominance levels of the reconstructed image (FIG. 1d) are substantially different from those of the original image (FIG. 1a) because of the abrupt variation (stepwise) of the chrominance in the original image.

As stated in F. X. Coudoux, M. G. Gazalet, and P. Corlay, "An adaptive post-processing technique for the reduction of color bleeding in DCT coded images," *IEEE Transaction on Circuits Systems for Video Technology*, Vol. 14, No. 1 (January 2004), this phenomenon is due to the fact that a quantization and a decimation are executed (essentially in a 4:2:0 subsampling), that introduce spurious information in the reconstructed image.

Examples of color bleeding are evident in a reconstructed image of FIG. 2b (same scene of FIG. 2a), according to the MPEG4 standard, in particular in proximity of the poster and close to the neck of the player, as highlighted in the magnified detail views of FIGS. 2b' and 2b''. Artifacts of this type are present also in FIGS. 3b and 4b. Recent articles such as F. X. Coudoux, M. G. Gazalet, and P. Corlay, "An adaptive post-processing technique for the reduction of color bleeding in DCT coded images," *IEEE Transaction on Circuits Systems for Video Technology*, Vol. 14, No. 1 (January 2004), and F. X. Coudoux, M. G. Gazalet and P. Corlay, "A DCT Domain Postprocessor For Color Bleeding Removal", Proceedings of the 2005 European Conference on Circuit Theory and Design (2005), propose algorithms for reducing these undesired effects. The image to be elaborated is decomposed in blocks, as depicted in FIG. 5, thus the blocks A B C D potentially affected by color bleeding are identified and their chrominance components Cr and Cb are corrected.

In order to identify image blocks potentially affected by color bleeding, the variances of the chrominance components Cr and Cb and the sharpness of the related luminance block are calculated using a filter for detecting contours of displayed objects, and these values are compared with thresholds. The reason for doing this consists in that color bleeding phenomena occur in correspondence of blocks containing relatively abrupt chrominance and luminance variations.

Undesired effects of color bleeding are eliminated by substituting chrominance components of each block to be corrected (A, B, C, D) with an average of the chrominance components of the surrounding blocks $b_0, b_1, \ldots, b_7$ not affected by color bleeding.

However, these known methods are unable to correct color bleeding effects without sensibly worsening the definition of the contours of the displayed objects. Correcting each pixel simply by averaging chrominance pixels of neighboring blocks reduces color bleeding effects, but at the same time increases the blurring of the contours of displayed objects. This happens because pixels of a block that are differently affected by color bleeding are processed all in the same way. Moreover, the known methods are based on a discrimination among blocks recognized as affected or not by color bleeding, thus in case of an imprecise discrimination they introduce chromatic distortions in blocks originally free of distortion.

BRIEF SUMMARY

In an embodiment, a method of processing digital images to reduce the effects of color bleeding comprises determining chrominance components for pixels in a working window and assigning weights to the pixels in the working window. A chrominance correction for a center pixel in the working window is generated based on the chrominance components and the assigned weights. Fuzzy variables and thresholds may be applied to generate the assigned weights and the chrominance correction.

The applicants have found a method of processing digital images for reducing color bleeding effects without degrading the definition of the contours of depicted objects.

An embodiment processes the image to be corrected not per blocks, as in known methods, but per pixels by averaging chrominance components of each pixel with that of the pixels contained in a working window centered on the current pixel, using weights established by fuzzy rules. The weights are obtained as a product of two fuzzy variables ew and mw, the membership functions of which are established such that relatively large weights are assigned to chrominance pixels relatively far from the contour of depicted objects and belonging to homogeneous zones, and relatively small or even null weights are assigned in the opposite case.

In an embodiment, the first fuzzy variable ew is null if the maximum chromatic variation d inside a working window centered on the current pixel exceeds a first threshold and has a linear characteristic that decreases for increasing values of d below the first threshold, whilst the second fuzzy variable mw depends on the square of the amplitude m of the chrominance gradient in correspondence of the central pixel of the window. The fuzzy variable mw is preferably null if m exceeds a second threshold, is always 1 in correspondence of the central pixel of the working window and has a linear decreasing characteristic for increasing values of m below the second threshold.

An embodiment of a method of this invention may be implemented through a software run in a computer or microprocessor.

In an embodiment, a method of processing pixels in a digital image to reduce color bleeding comprises: identifying a working window around a selected pixel in the digital image; determining a chrominance component for each pixel in the working window around the selected pixel; assigning a weight to each pixel in the working window around the selected pixel based on a comparison of the determined chrominance components with a threshold; and selectively adjusting a chrominance component for the selected pixel based on the determined chrominance components and the assigned weights. In an embodiment, determining the chrominance components comprises determining a maximum amplitude of a chrominance gradient. In an embodiment, the method further comprises determining the assigned weights based on a product of two fuzzy variables. In an embodiment, assigning the weight to a pixel in the working window around the selected pixel comprises determining whether the pixel is part of an object associated with the selected pixel.

In an embodiment, a device for processing a digital image comprises: an input configured to receive the digital image; a chrominance magnitude calculation module configured to generate chrominance components for a set of pixels in a working window in the digital image; a kernel modulator configured to selectively assign weights to the pixels in the working window and to selectively generate a corrected chrominance component of a center pixel in the working window based on the generated chrominance components and the assigned weights; and an output for outputting the processed digital image. In an embodiment, the device further comprises: an activation module coupled to the kernel modulator and configured to selectively adjust the corrected chrominance component based on a calculated chrominance magnitude for the selected pixel and the corrected chrominance component. In an embodiment, the device further comprises an edges detector configured to compare pixel gradients with threshold gradients; and a bleeding macro-block detection module configured to identify blocks of pixels for processing by the kernel modulator.

In an embodiment, a system to process digital images comprises: an input configured to receive a digital image; means for calculating chrominance components of pixels in a working window in the digital image; means for assigning weights to each pixel in the working window and generating a chrominance correction for a center pixel in the working window based on the calculated chrominance components and the assigned weights; and an output configured to output the processed digital image. In an embodiment, the system further comprises: means for selectively adjusting the chrominance correction for the center pixel based on a calculated chrominance magnitude for the center pixel and the chrominance correction for the center pixel. In an embodiment, the system further comprises: means for identifying blocks in the digital image for processing by the means for assigning weights and generating chrominance corrections. In an embodiment, the system further comprises means for acquiring a digital image coupled to the input.

In an embodiment, a computer-readable medium comprises program code that causes a computing device to implement a method that includes: identifying a working window around a selected pixel in a digital image; determining a chrominance component for each pixel in the working window around the selected pixel; and selectively assigning a weight to each pixel in the working window around the selected pixel based on a comparison of the determined chrominance components with a threshold; and adjusting a chrominance component for the selected pixel based on the determined chrominance components and the assigned weights. In an embodiment, determining the chrominance components comprises determining a maximum amplitude of a chrominance gradient. In an embodiment, the method further includes determining the assigned weights based on a product of two fuzzy variables. In an embodiment, assigning the weight to a pixel in the working window around the selected pixel comprises determining whether the pixel is part of an object associated with the selected pixel. In an embodiment, the method further includes identifying blocks in the digital image for the selective assignment and adjusting.

In an embodiment, a method of processing a digital image for reducing eventual color bleeding effects comprises the step of generating two corrected chrominance components (outputC$i,j$) of a pixel to be corrected as a weighted mean of respective chrominance values (inputC$i,j$) of all the pixels of said original image contained in a working window centered on the current pixel, wherein the weights (tap) used in said weighted mean are determined for each pixel of the window different from the central pixel as the product between a first fuzzy variable (ew) and a second fuzzy variable (mw), the value of the first fuzzy variable (ew) having values that decrease when the maximum difference (d) between the chrominance components of the central pixel and of the considered pixel increase, the value of the second fuzzy variable (mw) depending on the amplitude (m) of the chrominance gradient calculated in correspondence of the central pixel; the weight corresponding to the central pixel being one. In an embodiment, the values of said first (ew) and second (mw) fuzzy variables are determined by a decreasing linear function that is null only for values of said maximum difference and of said amplitude if the chrominance gradient smaller of a first (Tew) and second (Tmw) threshold, respectively. In an embodiment, the second threshold (Tmw) is proportional to the arithmetic mean on the whole image of the maximum squares of the chrominance gradients. In an embodiment, the first threshold (Tew) equals a fraction of the maximum value that a pixel of the input image may assume. In an embodiment, the chrominance gradient is obtained by using horizontal and vertical Sobel filters defined on said working window. In an embodiment, the method further comprises the steps of: generating final chrominance components (final_outputC$i,j$) for said current pixel through a second weighted mean of the respective chrominance components of said pixel of the original image (inputC$i,j$) and of said corrected chrominance components (outputC$i,j$), said corrected chrominance components (outputC$i,j$) being weighted with the one's complement of the weight (ow) for the chrominance components of said pixel of the original image (inputC$i,j$), said weight being determined through the following steps: defining a third fuzzy variable (cw) in function of the maximum squared amplitude of the gradients of the chrominance components (MAX (MagCb, MagCr)) in correspondence of the current pixel (i,j), defining a fourth fuzzy variable (lw) in function of the squared amplitude of the luminance gradient (MagY) in correspondence of the current pixel (i,j), said weight (ow) being equal to the smallest of the values of said third (cw) and fourth (lw) fuzzy variables in correspondence of the current pixel (i,j). In an embodiment, the third (cw) and fourth (lw) fuzzy variables are defined by increasing membership functions equal to: one, for values of the maximum square of amplitudes of the gradients of chrominance components (MAX (MagCb, MagCr)) and of the maximum amplitude of the luminance gradient (MagY) larger than respective thresholds third (TC+AC) and fourth (TY+AY), respectively; zero, for values of the maximum square of amplitudes of the gradients of chrominance components (MAX(MagCb, MagCr)) and of the squared amplitude of the luminance gradient (MagY) smaller than respective thresholds fifth (TC−AC) and sixth (TY−AY), respectively. In an embodiment, the membership functions are linear between said third threshold (TC+AC) and said fifth threshold (TC−AC) and between said fourth threshold (TY+AY) and sixth threshold (TY−AY), respectively. In an embodiment, the mean values (TC, TY) between the thresholds third (TC+AC) and fifth (TC−AC) and between the thresholds fourth (TY+AY) and sixth (TY−AY) are respectively proportional to the arithmetic mean (MeanC) on the whole image of the maximum squared chrominance gradients and to the arithmetic mean (MeanY) on the whole image of the square of the amplitude of the luminance gradient (MagY); the differences between the thresholds third (TC+AC) and fifth (TC−AC) and between the thresholds (TY+AY) and sixth (TY−AY) are a fraction of the corresponding mean values (TC, TY). In an embodiment, the method comprises the step of identifying blocks of pixels of said image that are potentially corrupted by color bleeding through the steps of: calculating for each macroblock of said image to be processed a first arithmetic mean (MeanC) on the whole image of the maximum squares of the chrominance gradients and a second arithmetic mean (MeanY) on the whole image of the squared amplitude of the luminance gradient (MagY), comparing the amplitude of chrominance and luminance gradients in correspondence of each pixel with respective seventh and eighth thresholds determined in function of said first (MeanC) and second (MeanY) arithmetic means, judging the current block as a block potentially affected by color bleeding in function of the results of comparisons carried out at the previous point; reducing color bleeding effects by carrying out the method steps only on blocks potentially affected by color bleeding identified at the previous step. In an embodiment, the seventh and eighth thresholds are proportional to said first (MeanC) and second (MeanY) arithmetic mean. In an embodiment, the current macroblock is judged potentially affected by color bleeding if the amplitude of at least a chrominance gradient of any pixel of the macroblock exceeds the seventh threshold. In an embodiment, the current macroblock is judged potentially affected by color bleeding if at the same time the amplitude of the chrominance gradient of any pixel of the macroblock exceeds the eighth threshold. In an embodiment, the method comprises the step of calculating said chrominance gradients on the image of the video sequence that precedes the image to be processed.

BRIEF DESCRIPTION OF THE SEVERAL VIEWS OF THE DRAWINGS

The patent or application file contains at least one drawing executed in color. Copies of the patent or patent application publication with color drawings will be provided by the Office upon request and payment of the necessary fee.

FIGS. 2a' and 2a" show details of the image of FIG. 2a.

FIGS. 2b' and 2b" show details of the image of FIG. 2b corresponding to those of FIGS. 2a' and 2a".

FIGS. 3a' and 3a" show details of the image of FIG. 3a.

FIGS. 3b' and 3b" show details of the image of FIG. 3b corresponding to those of FIGS. 3a' and 3a".

FIGS. 4a' and 4a" show details of the image of FIG. 4a.

FIGS. 4b' and 4b" show details of the image of FIG. 4b corresponding to those of FIGS. 4a' and 4a".

FIGS. 23a' and 23a" show details of the image of FIG. 23a.

FIGS. 23b' and 23b" show details of the image of FIG. 23b corresponding to those of FIGS. 23a' and 23a".

FIGS. 24a' and 24a" show details of the image of FIG. 24a.

FIGS. 24b' and 24b" show details of the image of FIG. 24b corresponding to those of FIGS. 24a' and 24a".

FIGS. 25a' and 25a" show details of the image of FIG. 25a.

FIGS. 25b' and 25b" show details of the image of FIG. 25b corresponding to those of FIGS. 25a' and 25a".

DETAILED DESCRIPTION

Figure 6:
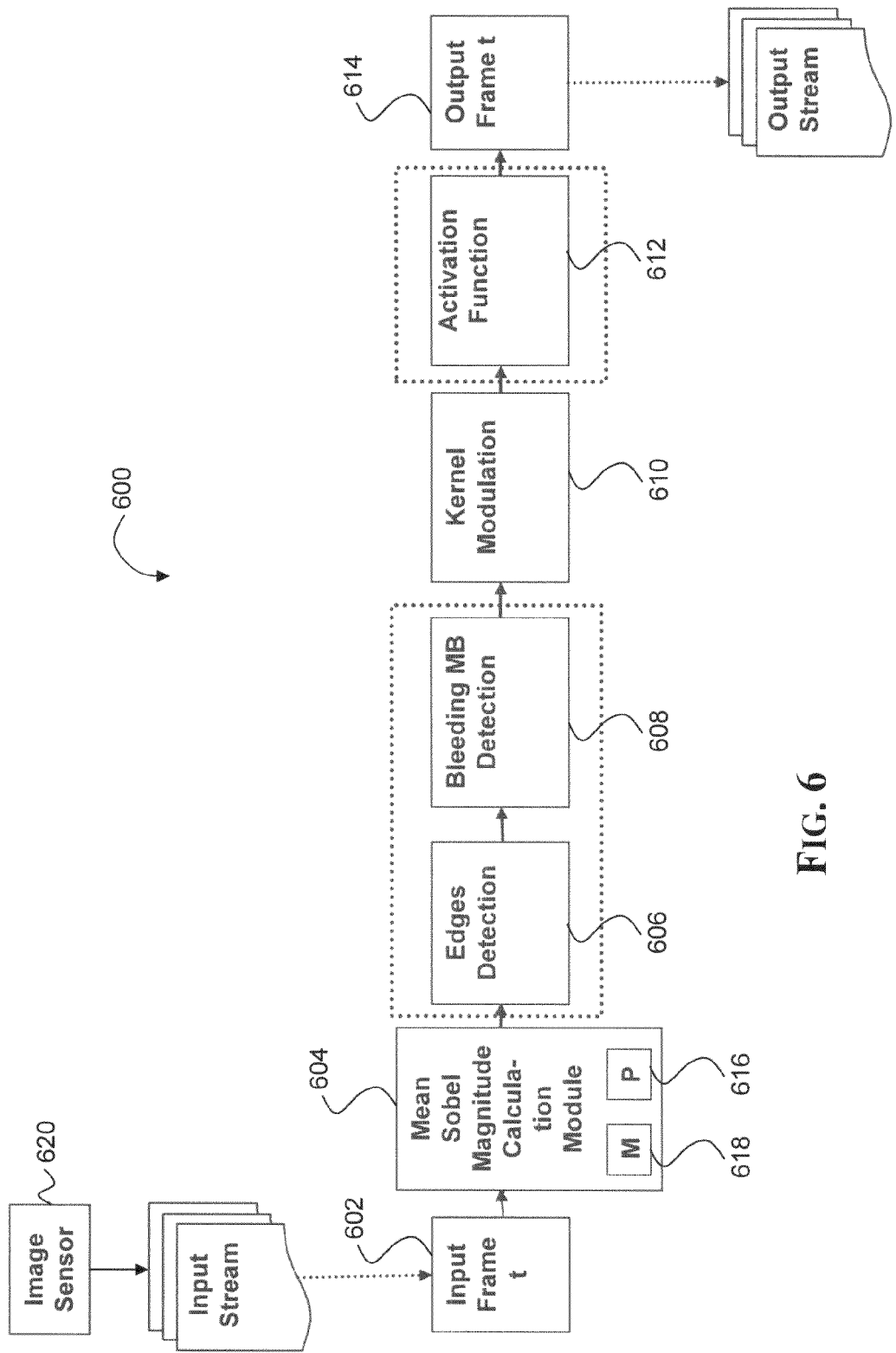
FIG. 6 illustrates an embodiment for correcting image blocks affected by color bleeding in a video sequence.

A block diagram of an embodiment of a system 600 is illustrated in FIG. 6. The system 600 comprises an input 602 for receiving an input frame, a mean Sobel magnitude calculation block or module 604, an edges detection block 606, a bleeding MB detection block 608, a kernel modulation block 610, an activation function block 612, and an output 614. As illustrated, the mean Sobel magnitude calculation module 604 comprises a processor 616 and a memory 618. The system 600 also comprises a means for acquiring a digital images, which as illustrated is an image sensor 620. Images may also be acquired from, for example, a memory storing a digital image or a receiver receiving a signal containing a digital image. Embodiments of the system 600 and the various modules of the system 600 may be implemented in a variety of ways, including as a combined system or as separate subsystems. Embodiments may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, separately described sub-modules may be combined.

An embodiment of a method of processing images of video sequences will be described with respect to the embodiment of the system 600 illustrated in FIG. 6. The blocks bordered by dotted rectangles symbolize modules or operations that may often be omitted in some embodiments.

Figure 1:
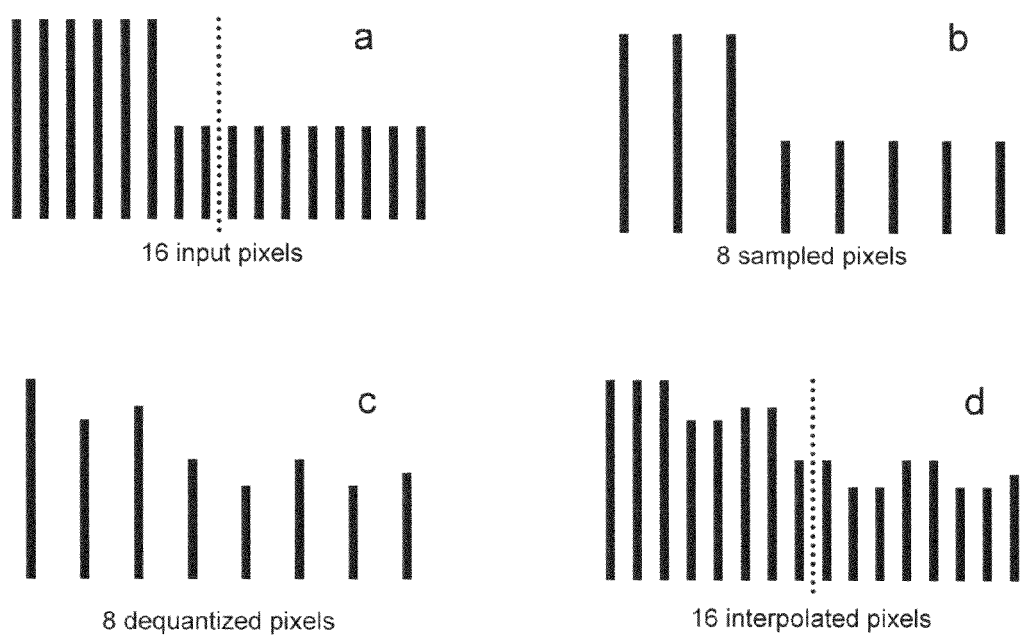
FIG. 1 illustrates how the color bleeding phenomenon is generated.
Figure 2:
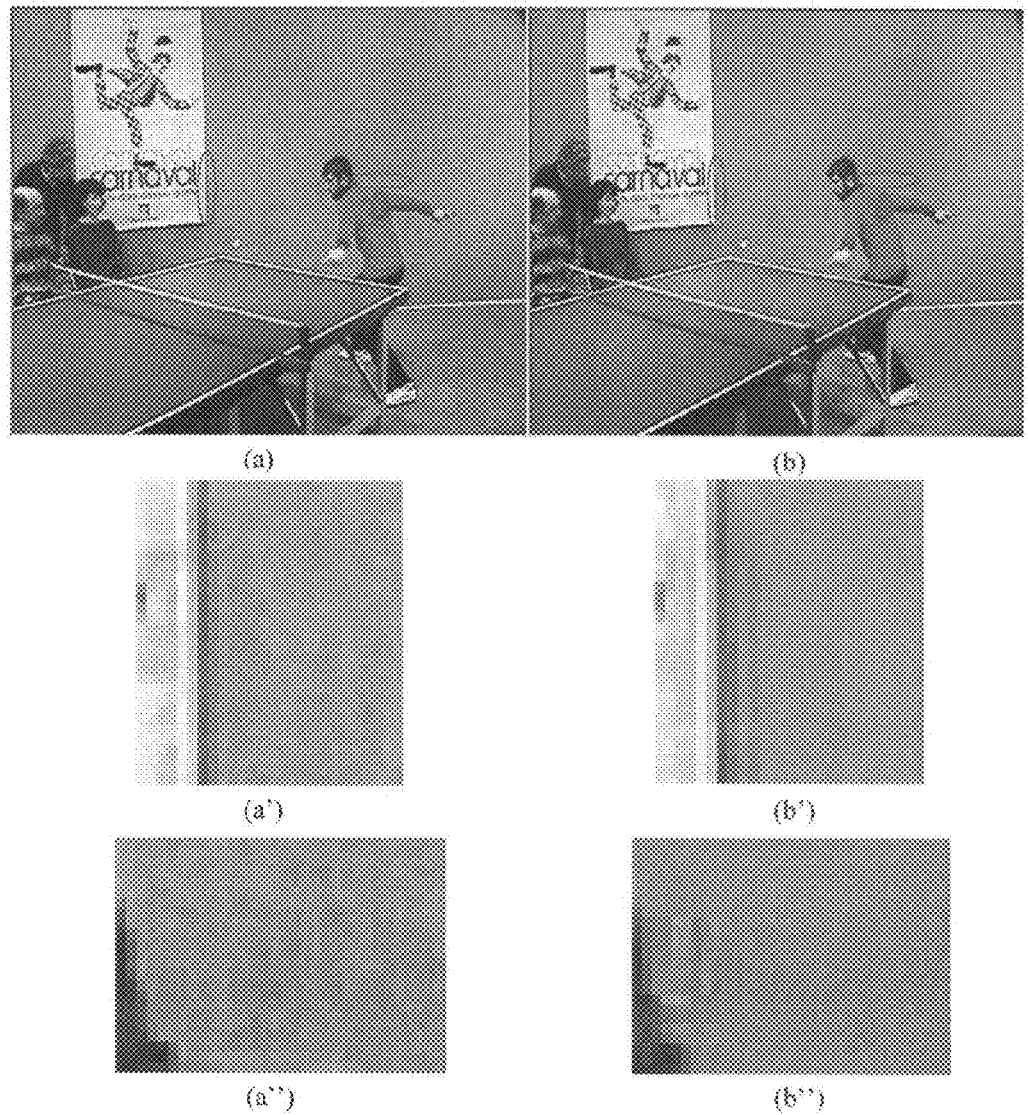
FIG. 2a is an image of a video sequence (referred as "table").
FIG. 2b is a replica of the image of FIG. 2a coded according to the 114 kbit/s MPEG4 standard, at 15 fps.
Figure 3:
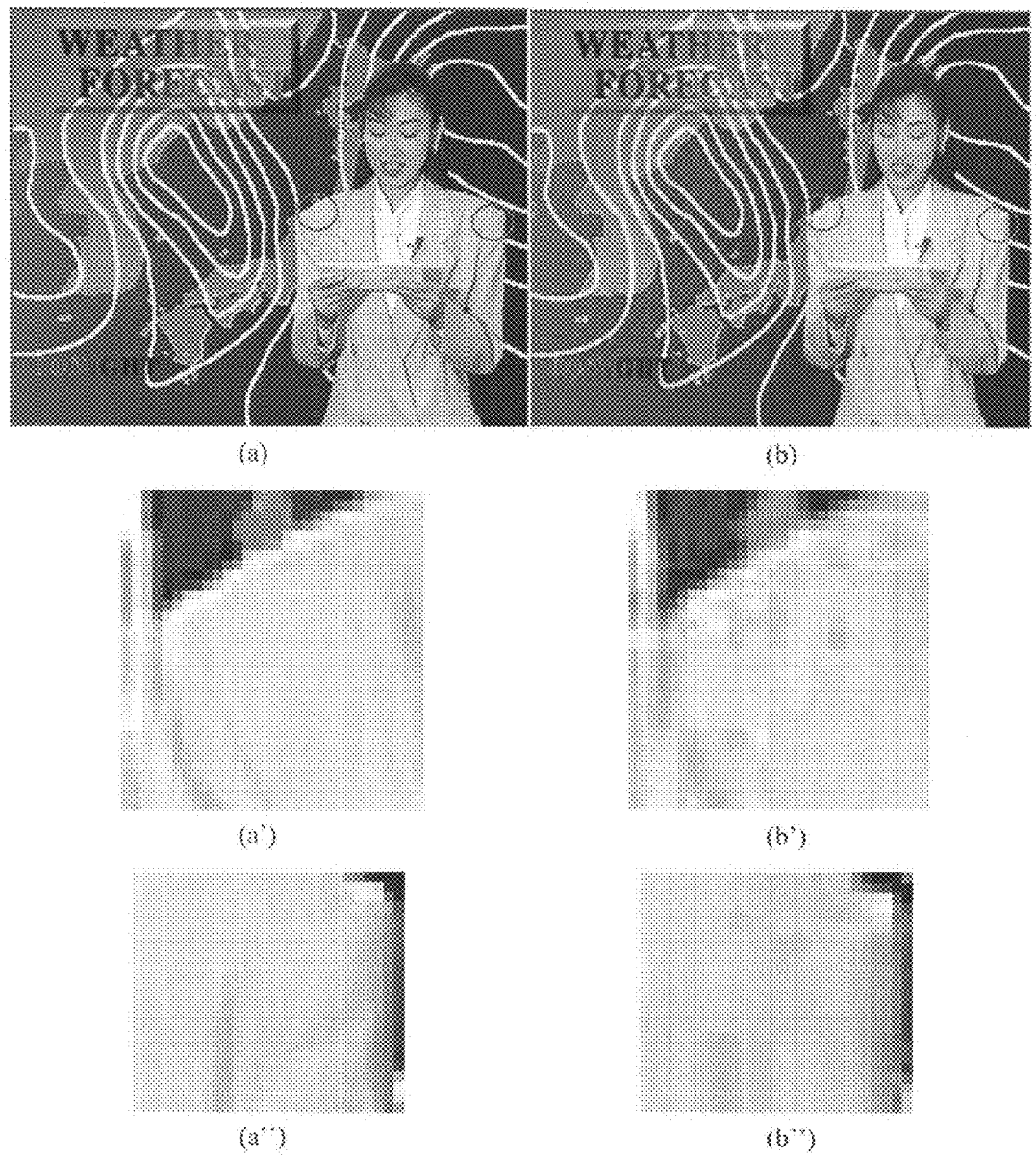
FIG. 3a is an image of a video sequence (referred as "weather").
FIG. 3b is a replica of the image of FIG. 3a coded according to the 114 kbit/s MPEG4 standard, at 15 fps.
Figure 4:
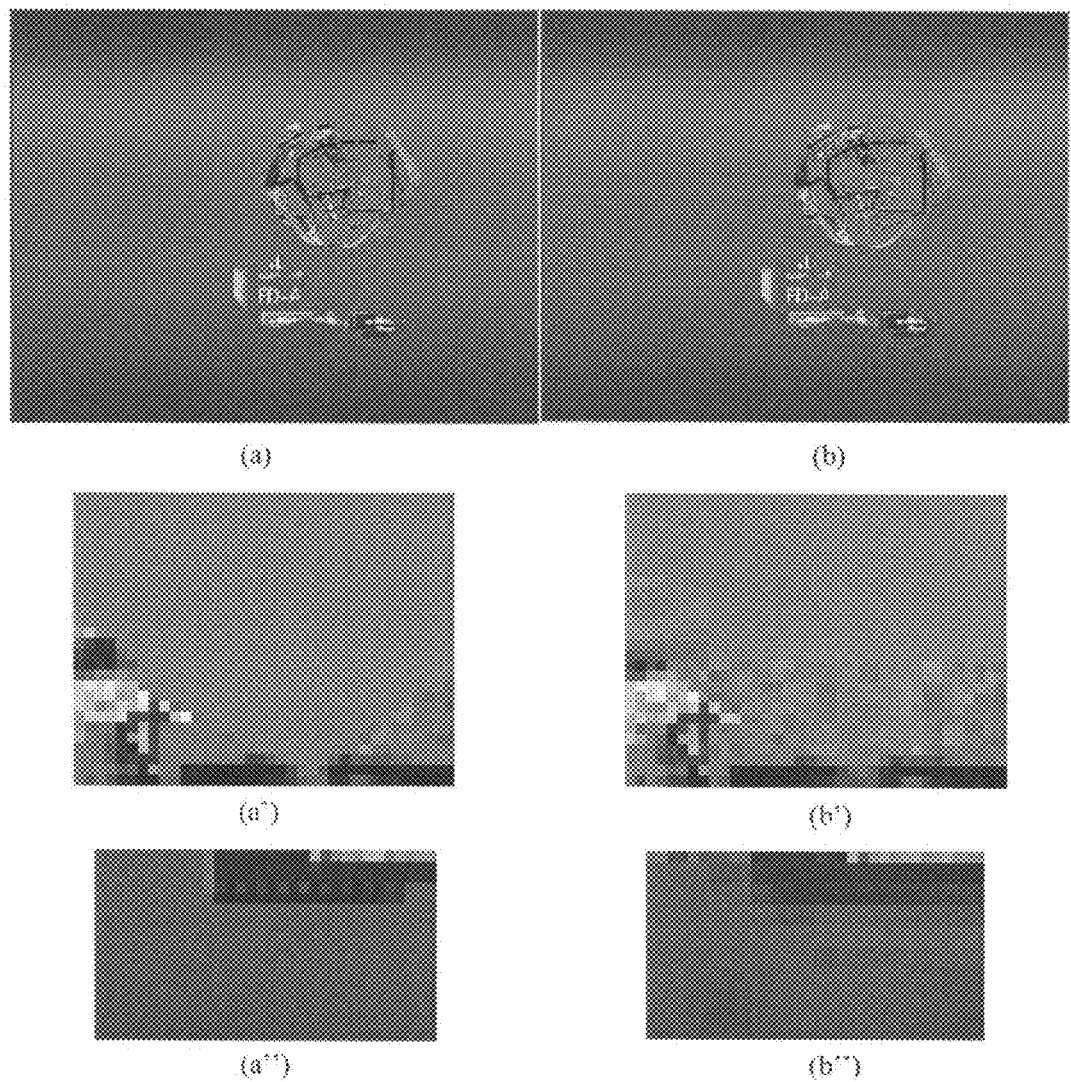
FIG. 4a is an image of a video sequence (referred as "synthetic2").
FIG. 4b is a replica of the image of FIG. 4a coded according to the 114 kbit/s MPEG4 standard, at 15 fps.
Figures 5, 7:
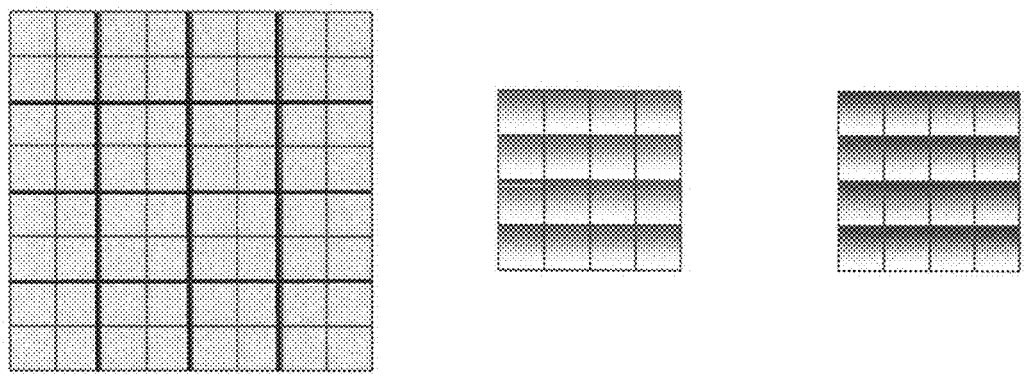
FIG. 5 shows blocks of pixels (grey shaded) used in a prior art method for correcting blocks A, B, C and D affected by color bleeding.
FIG. 7 depicts a 8×8 luminance block and two 4×4 chrominance blocks Cb and Cr that compose an image macroblock.

The image to be processed is subdivided into macroblocks, each macroblock being composed, for example, of a 3×8 block of luminance Y and by two blocks 4×4 of chrominance, respectively Cb and Cr (FIG. 7). In correspondence of each pixel of the luminance block and of the chrominance blocks Cb and Cr, horizontal and vertical components $S_x$ and $S_y$ of the luminance and chrominance gradients using horizontal and vertical Sobel filters (MEAN SOBEL MAGNITUDE CALCULATION):

$$S_x = \begin{bmatrix} -1 & 0 & 1 \\ -2 & 0 & 2 \\ -1 & 0 & 1 \end{bmatrix} \text{ and } S_y = \begin{bmatrix} -1 & -2 & -1 \\ 0 & 0 & 0 \\ 1 & 2 & 1 \end{bmatrix}$$

respectively, are calculated by Mean Sobel Calculation block 604.

Then the square of the amplitudes $\text{Mag}^Y(x,y)$, $\text{Mag}^{Cb}(x,y)$, $\text{Mag}^{Cr}(x,y)$ of these gradients of luminance Y and of chrominance Cb and Cr, respectively, are calculated.

The mean value MeanY and MeanC of the squares of the luminance and chrominance amplitudes for the whole image may be calculated using the following formulas:

$$MeanY = \frac{\sum Mag^Y(x,y)}{YWidth * YHeight}; \tag{1}$$

$$MeanC = \frac{\sum MAX(Mag^{Cr}(x,y), Mag^{Cb}(x,y))}{CWidth * CHeight}$$

wherein
YWidth=width of the image of the luminance component;
YHeight=height of the image of the luminance component;
CWidth=width of the image of the chrominance component;
CHeight=height of the image of the chrominance component;
MAX(a, b)=maximum value between the two values a and b.

Figure 8:
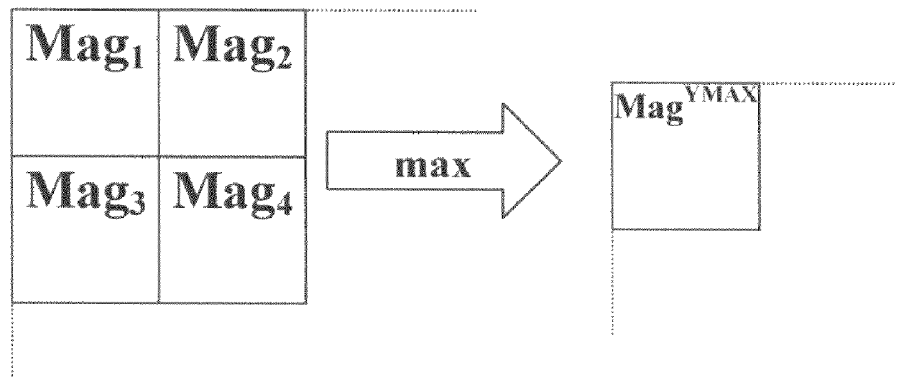
FIG. 8 schematically illustrates an embodiment of a method of calculation a maximum square of the amplitude of the luminance gradient in a 2×2 sub-block of the luminance block.

The 8×8 luminance block Y is subdivided into 2×2 sub-blocks (FIG. 7) and for each 2×2 sub-block the maximum amplitude $\text{Mag}^{YMAX}$ of luminance gradient is determined, as illustrated in FIG. 8. Moreover, for each pixel of the chrominance blocks Cb and Cr the maximum amplitude $\text{Mag}^{CMAX}$ of the chrominance gradient is determined. These values are used by successive blocks or in the successive steps for correcting color bleeding defects.

Two chrominance components Cb and Cr of each pixel of the current macroblock (KERNEL MODULATION) are obtained by determining a working window of a selected size centered on the current pixel and by calculating the chrominance components $outputC_{i,j}$ of the pixel (i,j) by carrying out a weighted mean of the respective chrominance components $inputC_{i+u,j+v}$ of all the pixels of the window, as defined in the following formula:

$$outputC_{i,j} = \sum_{u=-2}^{u=-2} \sum_{v=-2}^{v=2} inputC_{i+u,j+v} * tap_{u,v} \tag{2a}$$

In the previous example, the case in which the working window is a 5×5 window has been considered, but it is possible to use also a 3×3 working window or even of different size.

Each weight $tap_{u,v}$ may be obtained as the product of two fuzzy variables $ew_{i+u,j+v}$ and $mw_{i+u,j+v}$:

$$tap_{u,v} = ew_{i+u,j+v} * mw_{i+u,j+v} \tag{2b}$$

the value of which is determined with the fuzzy rules defined in function of the maximum module of chrominance variation, of the square of the amplitude of the chrominance gradient Mag(i,j) in the central pixel and of two thresholds. The variable $ew_{i+u,j+v}$ assumes nonnull values if in the working window there are chrominance variations smaller than a first threshold $T_{ew}$, that are null if the first threshold $T_{ew}$ is exceeded. The variable $mw_{i+u,j+v}$ is 1 for coordinates (i,j) of the central pixel of the window, while for the other pixels of the working window (i+u, j+v) assumes nonnull values if the square of the amplitude of the gradient in correspondence of the central pixel does not exceed a second threshold $T_{mw}$, null values if the second threshold $T_{mw}$ is exceeded.

The fuzzy variable ew may be chosen such to be substantially null for the pixels (i+u, j+v) of the working windows that belong to a different object from that to which the central pixel belongs, such to preserve the contours of the various depicted objects. Indeed, pixels of different objects have substantially different chrominance levels, while neighboring pixels belonging to a same object will have chrominance values very close one to the other.

The fuzzy variable mw determines a null weight to the chrominance value Cb or Cr of those pixels (i+u, j+v) of the working window different from the central pixel (i,j) if in correspondence of the central pixel the square of the chrominance gradient is larger than a second threshold, such to make larger the correction carried out in homogeneous regions. Indeed, if the central pixel belongs to an homogeneous zone, the chrominance gradients in correspondence thereof will be relatively small.

The weight tap is the product between the two fuzzy variables ew and mw, thus it is relatively large for the pixels of the working window (i+u, j+v) belonging to the same object of the central pixel (i,j) and is null for pixels (i+u, j+v) belonging to different objects.

Figure 11:
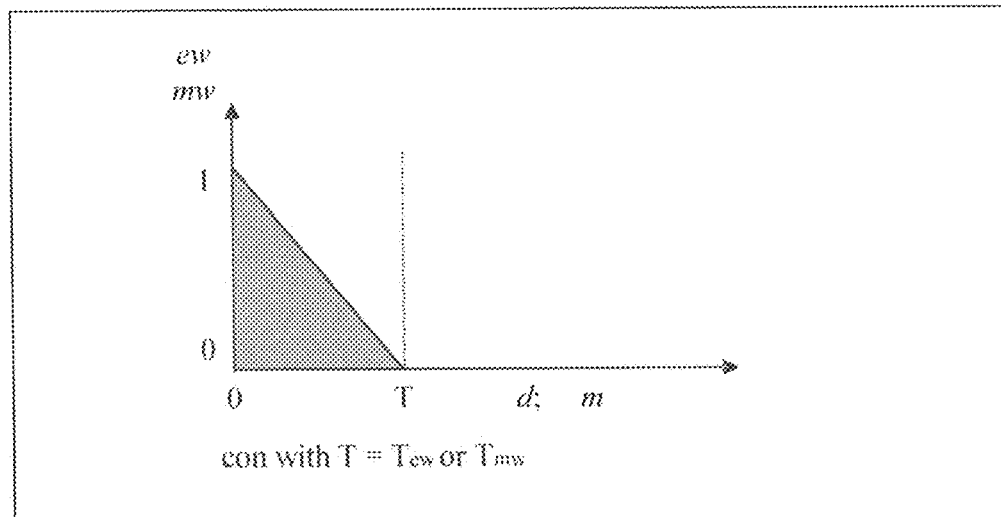
FIG. 11 is a graph of a sample membership function for the fuzzy variables ew and mw.

The two fuzzy variable ew and mw are modeled with a triangular membership function for simplifying calculations, like the membership function depicted in FIG. 11 and described by the following equations:

$$\begin{cases} ew_{i+u,j+v} = \text{Triangular}(T_{ew}, d) \\ d = \text{MAX}(|input_{i,j}^{Cr} - input_{i+u,j+v}^{Cr}|, |input_{i,j}^{Cb} - input_{i+u,j+v}^{Cb}|) \end{cases} \quad (3)$$

$$\begin{cases} mw_{i+u,j+v} = \begin{cases} \text{Triangular}(T_{mw}, m) & \text{if } (u \neq 0 \text{ and } v \neq 0) \\ 1 & \text{otherwise} \end{cases} \\ m = \text{Mag}(i, j) \end{cases}$$

After reviewing the specification, any skilled person will recognize that it is possible to choose a different membership function that assigns a null weight or a very small weight to chrominance values of pixels of different objects and a relatively large weight to pixels close to the considered one and that belong to the same displayed objects.

The thresholds may be chosen as defined by the following equations:

$$\begin{cases} T_{ew} = K_{ew} \\ T_{mw} = K_{mw} * MeanC \end{cases}$$

with $K_{ew}=64$ and $K_{mw}=1$.

An advantage due to the use of equations (2a) and (2b) is in that the image is locally processed at pixel level, whilst for example the methods disclosed in F. X. Coudoux, M. G. Gazalet, and P. Corlay, "An adaptive post-processing technique for the reduction of color bleeding in DCT coded images," IEEE Transaction on Circuits Systems for Video Technology, Vol. 14, No. 1 (January 2004) and F. X. Coudoux, M. G. Gazalet and P. Corlay, "A DCT Domain Postprocessor For Color Bleeding Removal", Proceedings of the 2005 European Conference on Circuit Theory and Design (28 Aug.-2 Sep. 2005) operate on blocks affected by color bleeding by correcting them using neighboring blocks. With an embodiment using equations 2a and 2b, pixels inside a chrominance block that are differently affected by color bleeding will be treated differently. This is due to the fact that the weights in equation (2a) are determined through fuzzy rules, the antecedents of which assume values that depend on chrominance values of the considered pixel and of neighboring pixels.

By contrast, with the known methods, for example those disclosed in the references identified in the previous paragraph, pixels belonging to the same block are corrected in the same way even if they are differently affected by color bleeding.

According to an embodiment of a method, the chrominance values $outputC_{i,j}$ obtained with equation (2a) are further corrected with a second weighted mean (ACTIVATION FUNCTION) of the values $outputC_{i,j}$ and $inputC_{i,j}$ using weights the value of which is defined by a fuzzy variable $ow_{i,j}$ determined in function of the maximum square of the amplitude of chrominance and luminance gradients in correspondence of the central pixel (i,j) of the working window and of other two thresholds $T^Y$ and $T^C$.

The weight $ow_{i,j}$ is fixed as follows. The 8×8 luminance block (FIG. 7) is subdivided in 2×2 sub-blocks (FIG. 8) and the maximum square $Mag^Y$ of the amplitude of the luminance gradient for the pixels of each 2×2 sub-block is determined.

Figure 9:
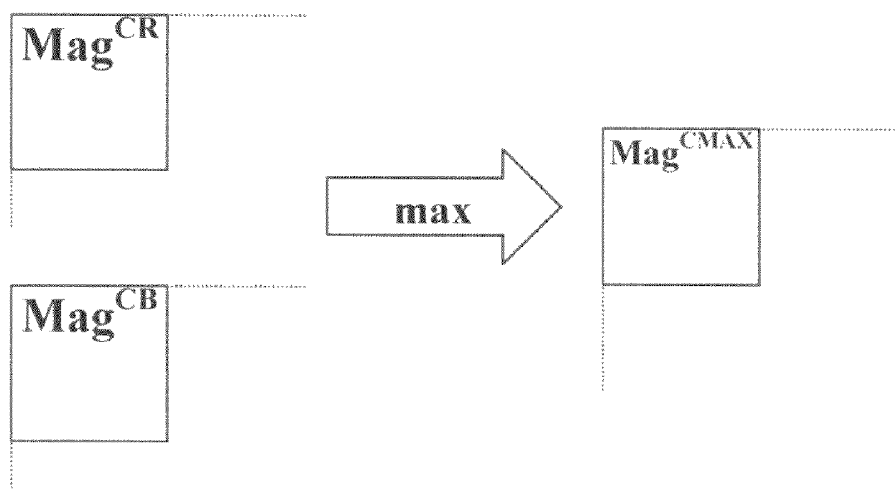
FIG. 9 schematically illustrates an embodiment of a method of calculating the maximum square of the chrominance gradient from two 1×1 sub-blocks of the chrominance blocks Cb and Cr.

The 4×4 chrominance blocks Cb and Cr are considered and for each pixel the corresponding maximum square $Mag^C$ of the amplitude of chrominance gradients Cb and Cr is determined (FIG. 9).

Figure 12:
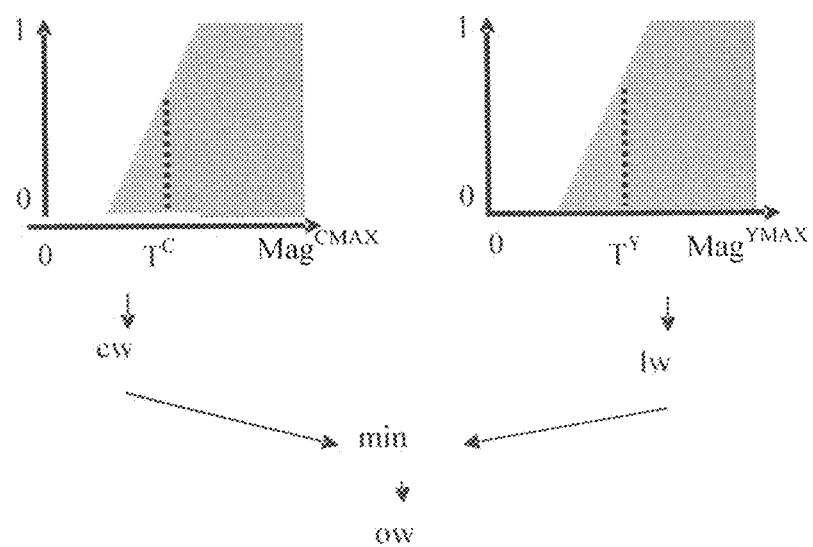
FIG. 12 is a graph of sample membership functions for the fuzzy variables cw and lw.
Figure 14:
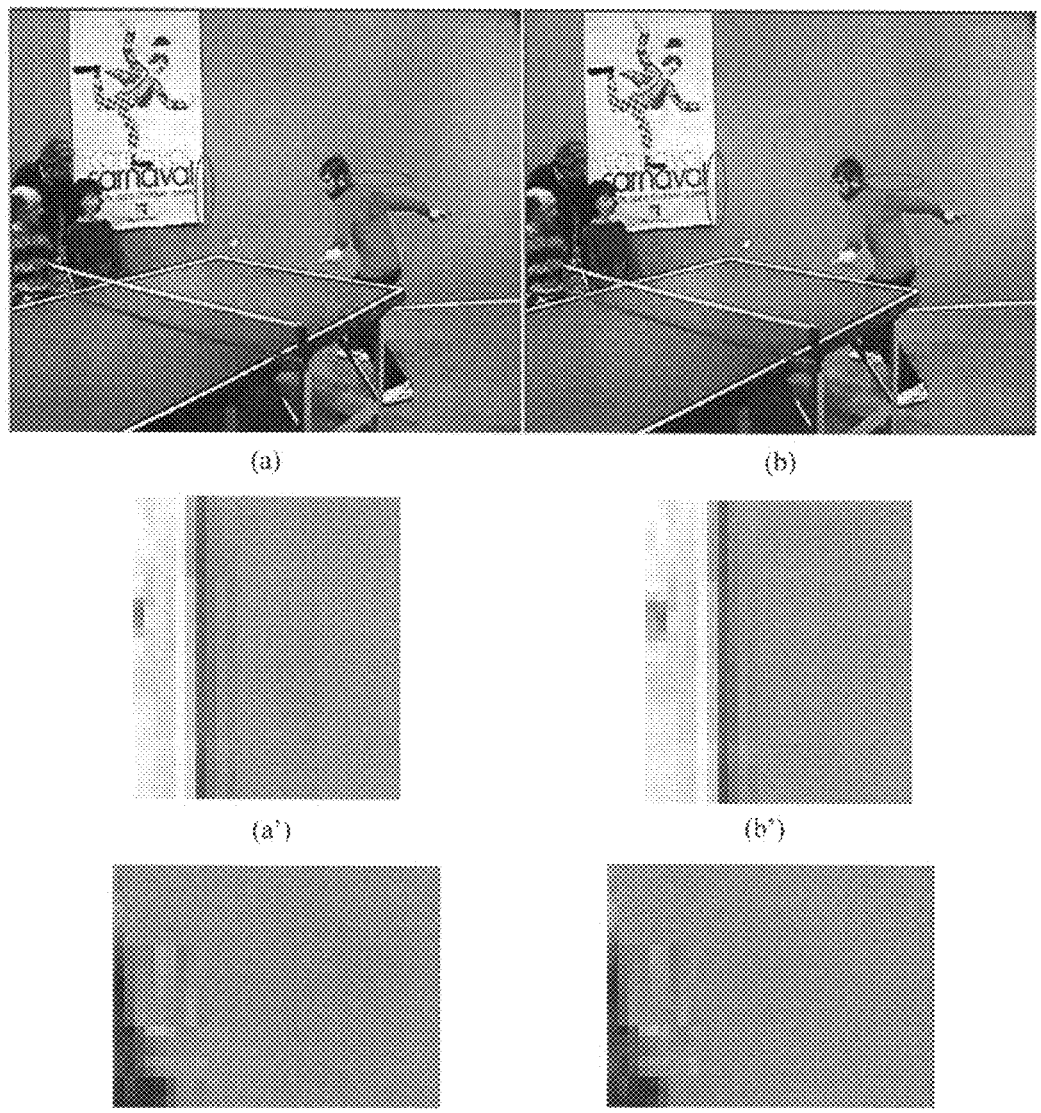
FIG. 14 compares the image of FIG. 2a and the details of FIGS. 2a' and 2a" with the corresponding corrected image (14b) and the corresponding details (14b' and 14b").
Figure 15:
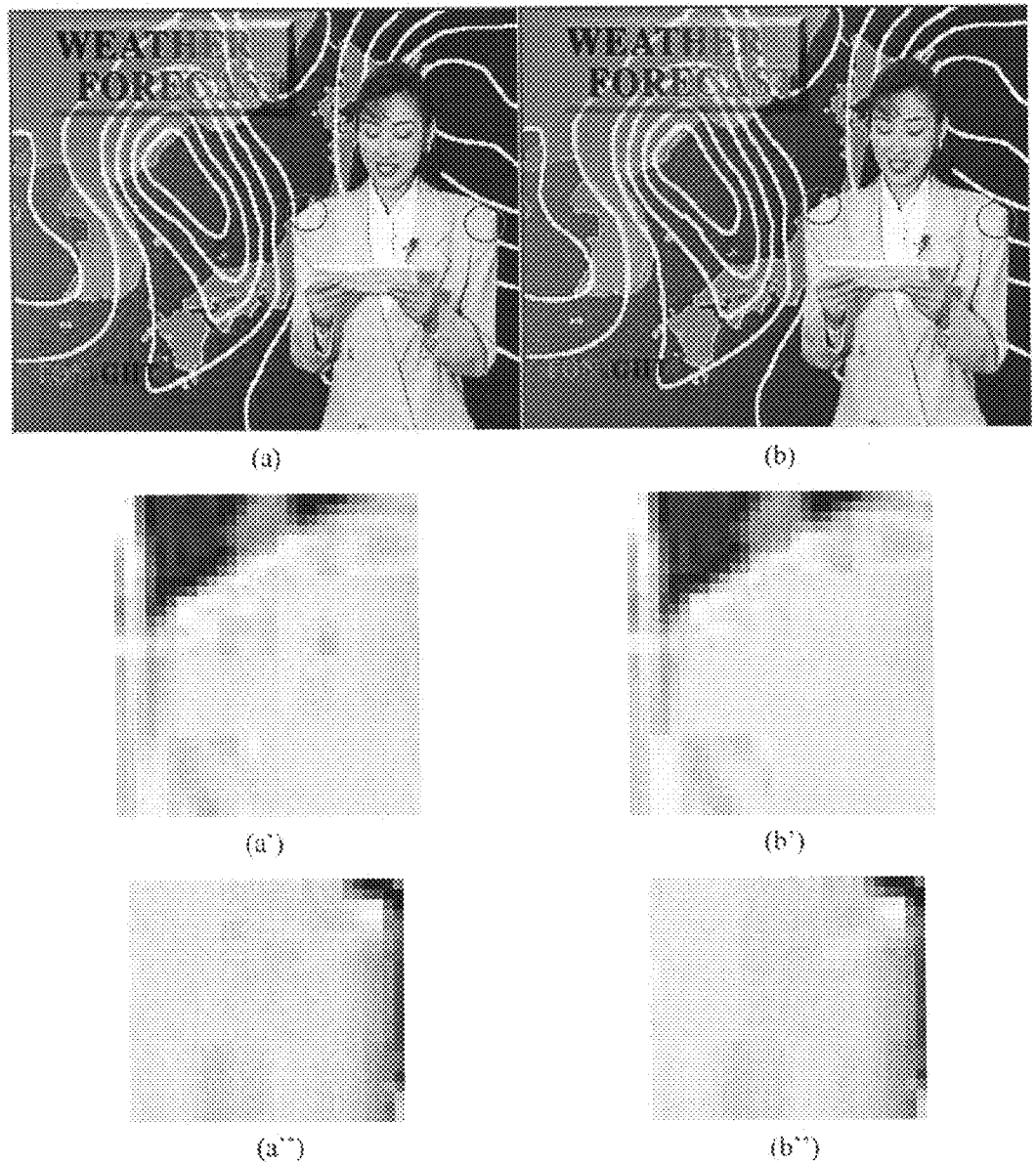
FIG. 15 compares the image of FIG. 3a and the details of FIGS. 3a' and 3a' with the corresponding corrected image (15b) and the corresponding details (15b' and 15b").
Figure 16:
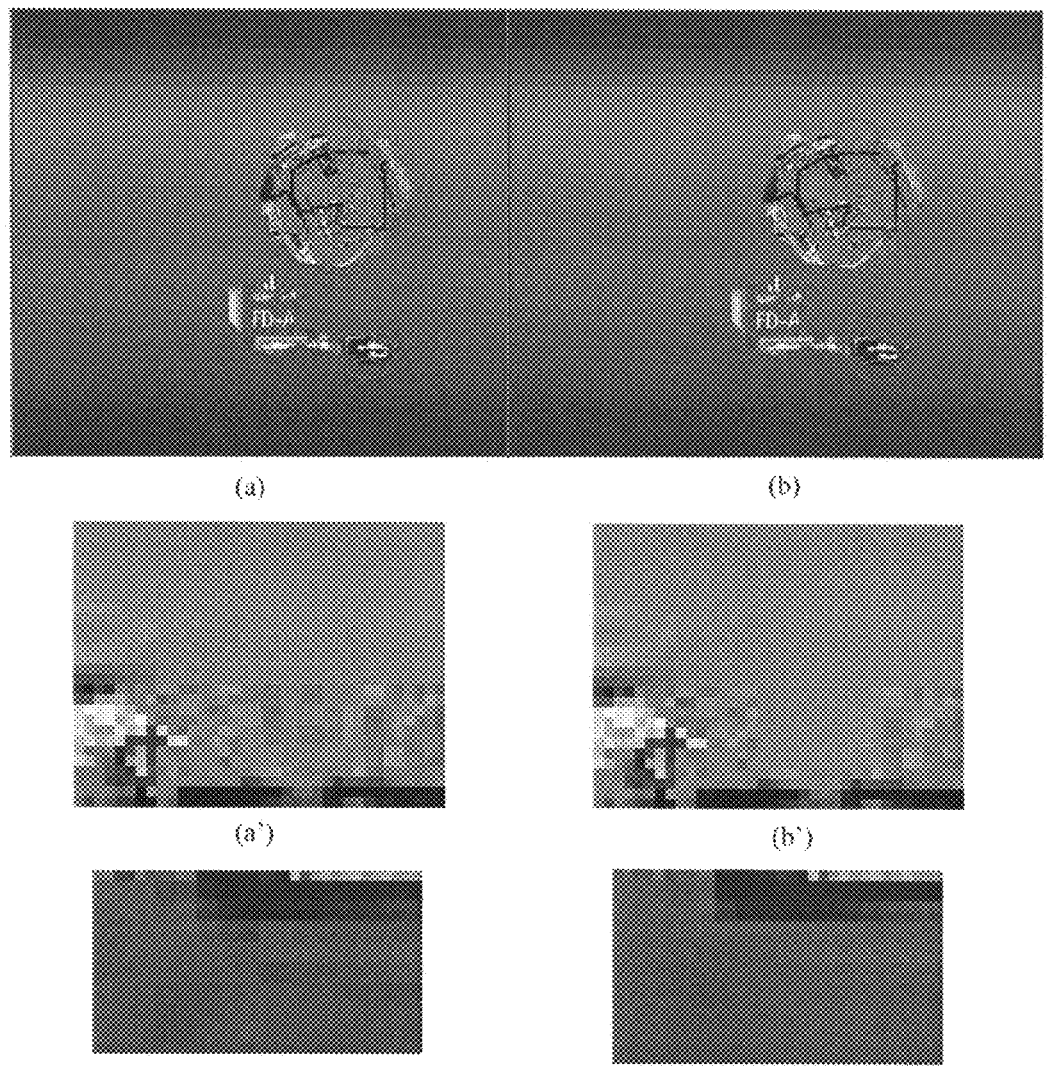
FIG. 16 compares the image of FIG. 4a and the details of FIGS. 4a' and 4a" with the corresponding corrected image (16b) and the corresponding details (16b' and 16b").
Figure 17:
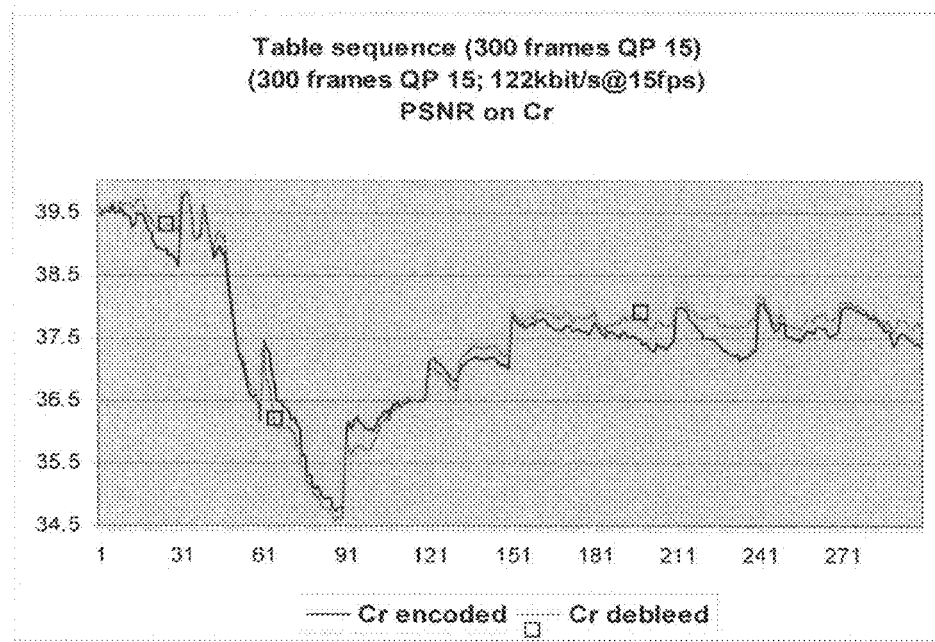
FIGS. 17 and 18 show PSNR graphs of the chrominance channels Cb and Cr, respectively, for each of the 300 images of the video sequence "table" before and after processing them according to an embodiment of a method.
Figure 18:
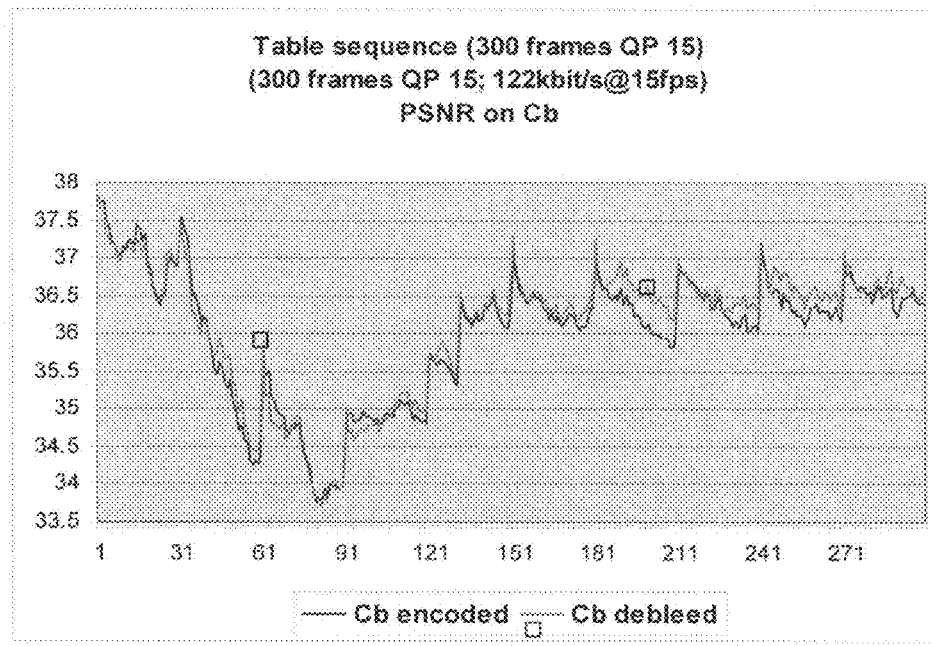
Figure 19:
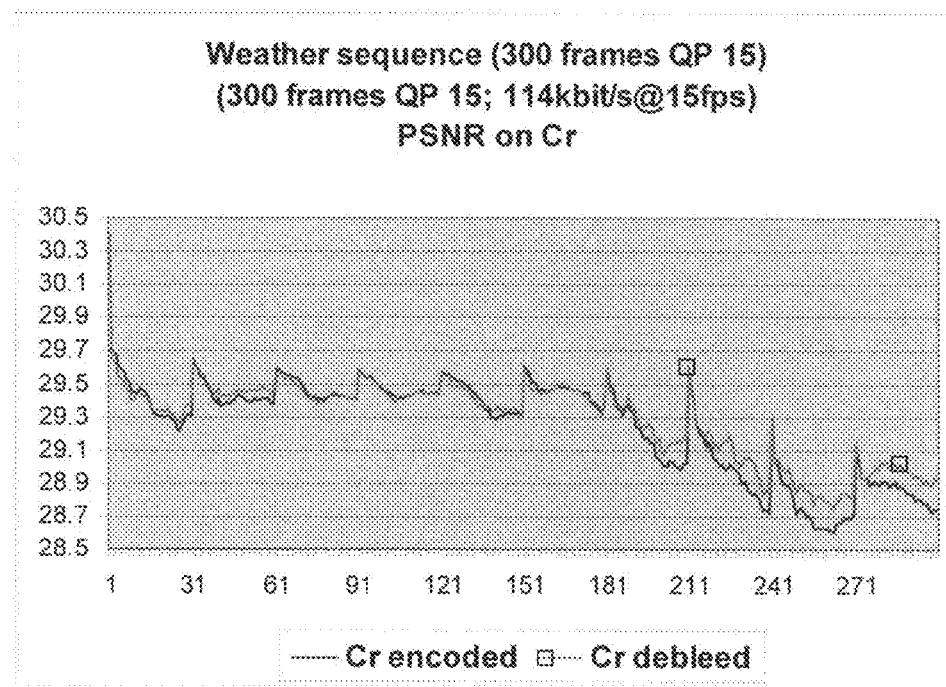
FIGS. 19 and 20 show PSNR graphs of the chrominance channels Cb and Cr, respectively, for each of the 300 images of the video sequence "weather" before and after processing them according to an embodiment of a method.
Figure 20:
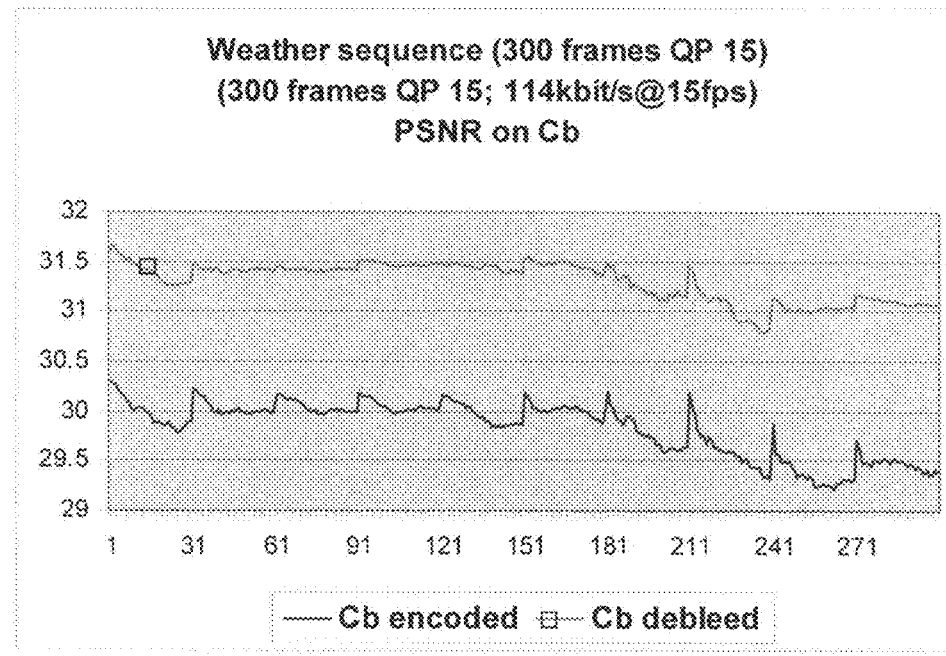
Figure 21:
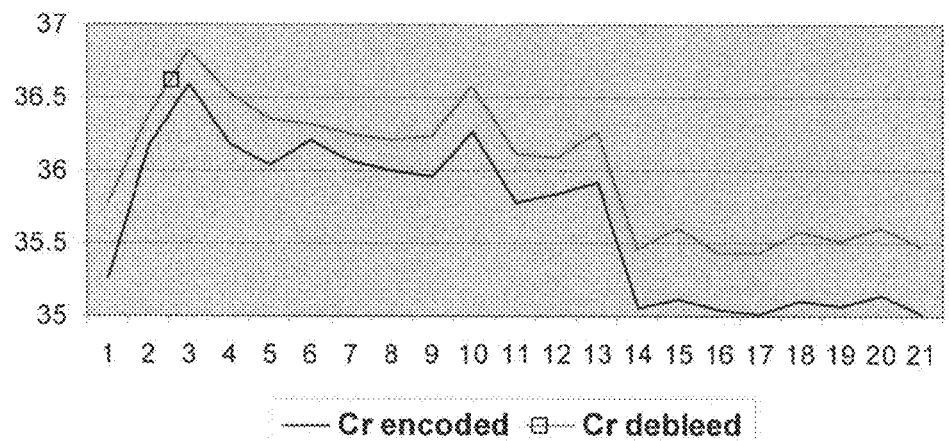
FIGS. 21 and 22 show PSNR graphs of the chrominance channels Cb and Cr, respectively, for each of the 22 images of the video sequence "synthetic2" before and after processing them according to an embodiment of a method.
Figure 22:
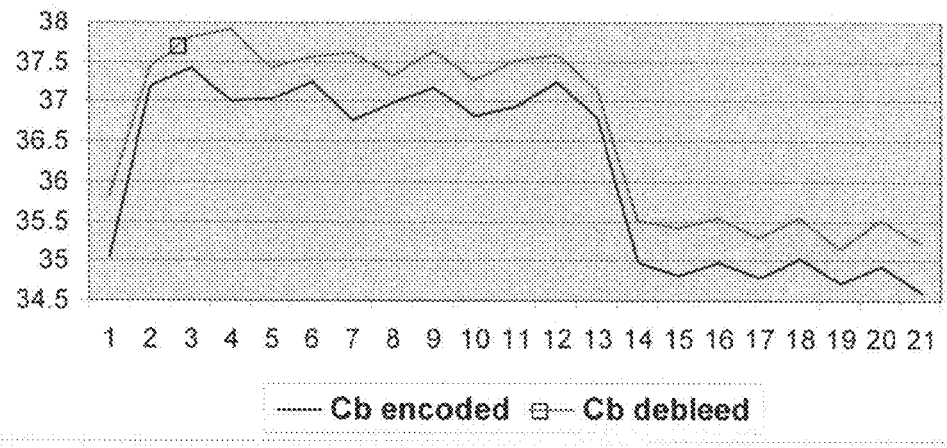
Figure 23:
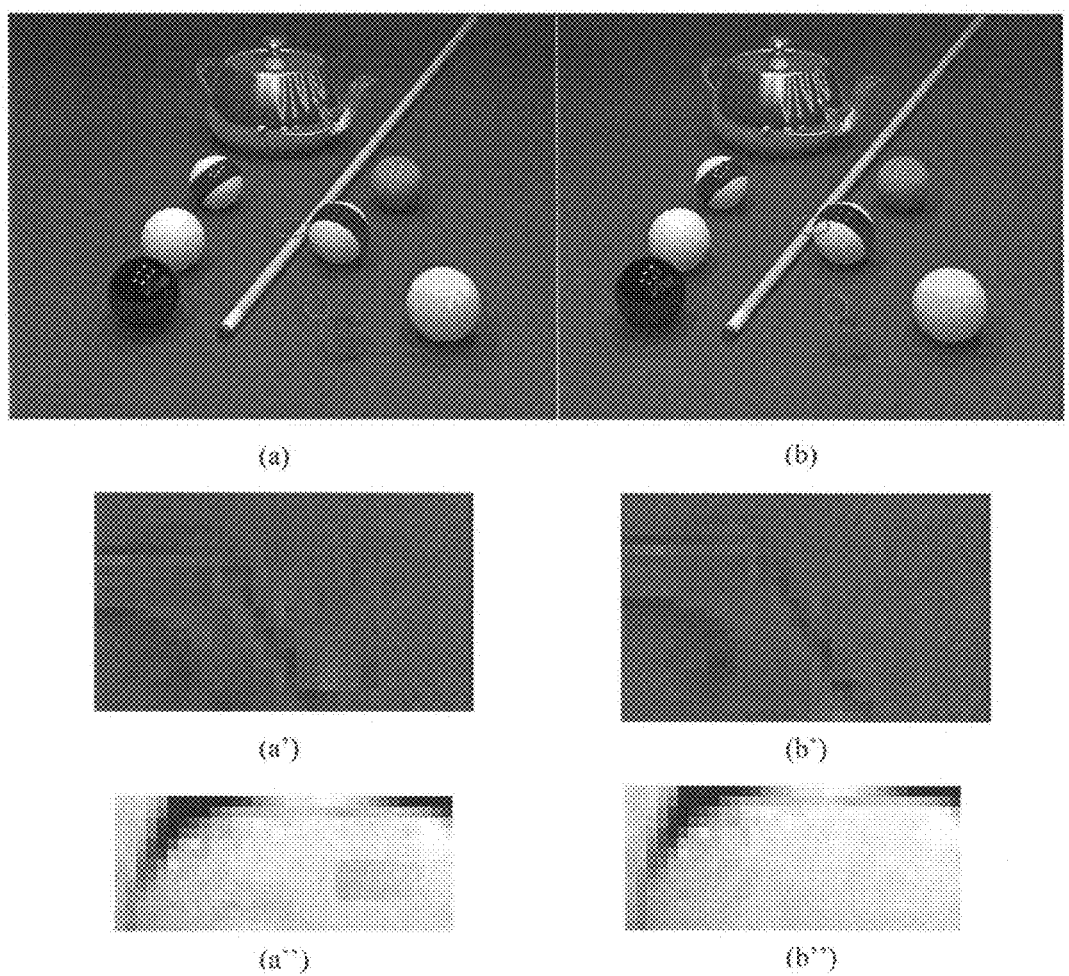
FIG. 23a is a static image (referred as "pool") coded at 0.8 bpp.
FIG. 23b is the image of FIG. 23a processed according to an embodiment of a method.
Figure 24:
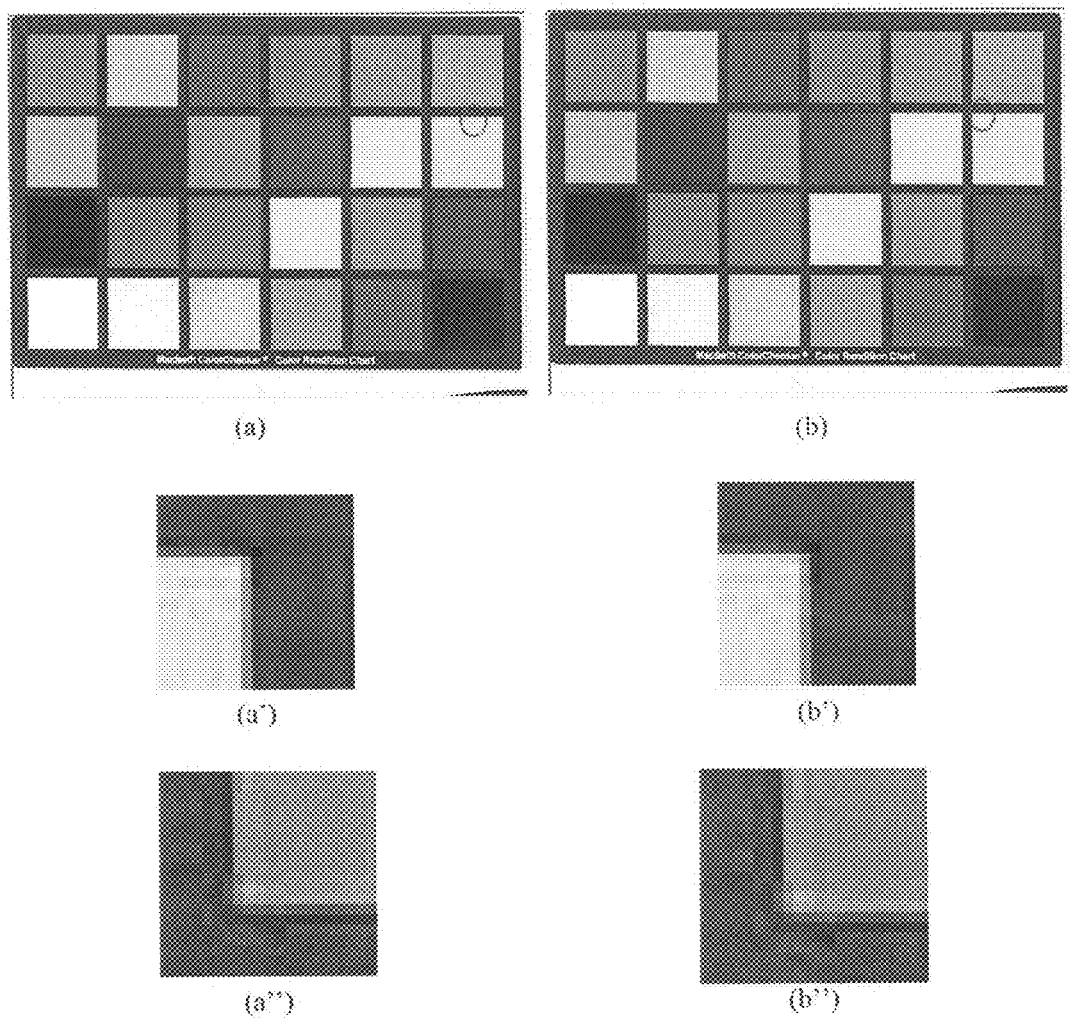
FIG. 24a is a static image (referred as "Macbeth") coded at 0.6 bpp.
FIG. 24b is the image of FIG. 24a processed according to an embodiment of a method.
Figure 25:
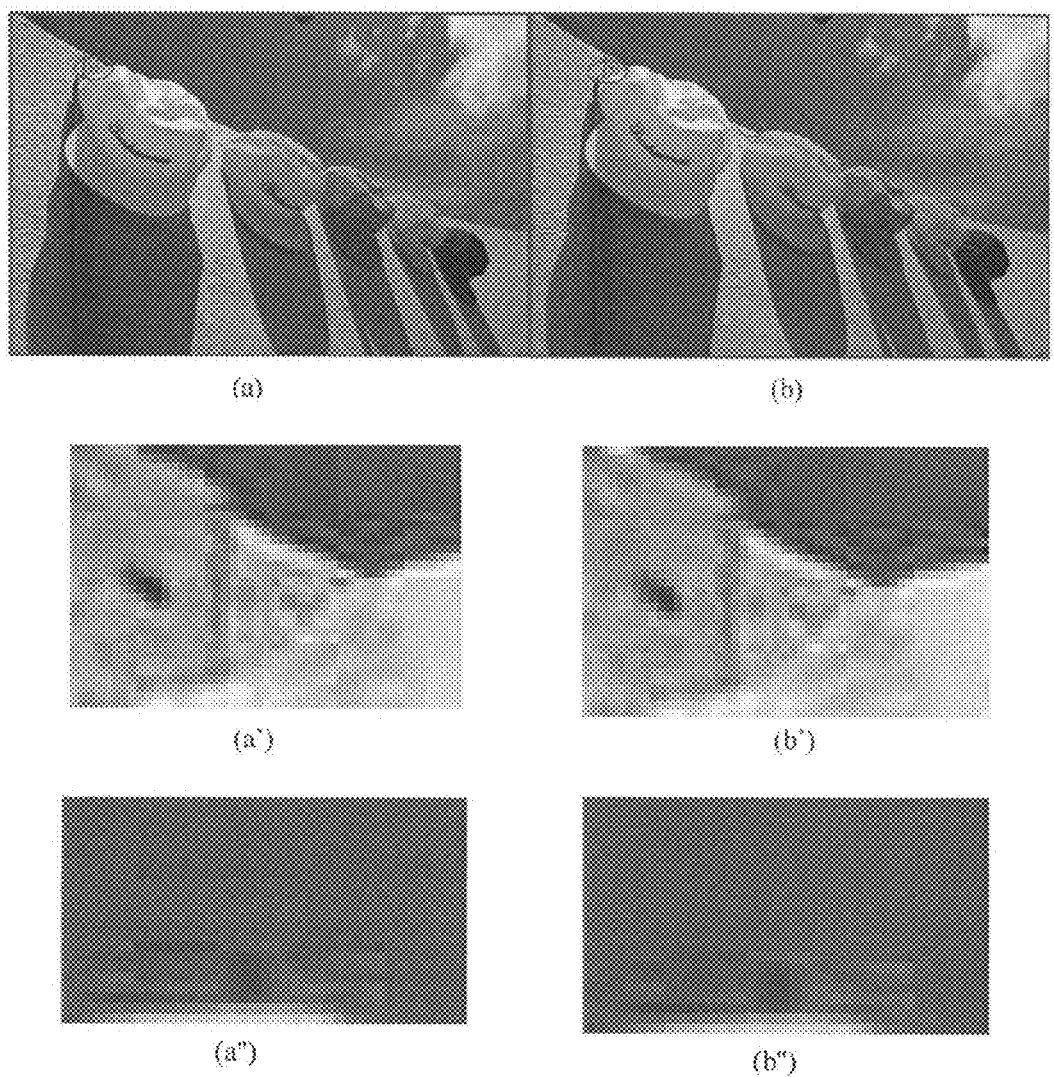
FIG. 25a is a static image (referred as "kodim1") coded at 0.4 bpp.
FIG. 25b is the image of FIG. 25a processed according to an embodiment of a method.

As depicted in FIG. 12, the fuzzy variable $ow_{i,j}$ is determined by choosing the minimum between two auxiliary fuzzy variables $cw_{i,j}$ and $lw_{i,j}$ described by a trapezoidal membership function, the value of each auxiliary fuzzy variable $cw_{i,j}$ and $lw_{i,j}$ being determined in function of the values $Mag^Y$ and $Mag^C$ (FIGS. 8 and 9) for the considered pixel (i,j).

In an embodiment, the chrominance values of the corrected pixels may be determined with the following equation:

$$\text{final\_output}C_{i,j}=(1.0-ow_{i,j})*\text{output}C_{i,j}+ow_{i,j}*\text{input}C_{i,j} \quad (4)$$

It is convenient to use also equation (4) and not only equation (2a) to reduce blurring of border pixels between two displayed objects. Tests carried out by the present applicant showed that there are relatively large luminance and chrominance gradients in correspondence of pixels of edges of depicted objects. If thus both luminance and chrominance gradients are relatively large, this means that a border is close to the considered pixel and the chrominance components $\text{final\_output}C_{i,j}$ of the corrected pixel are almost equal to the chrominance components $\text{input}C_{i,j}$ of the original pixel.

According to an embodiment, the thresholds $T^Y$ and $T^C$ are proportional to the luminance and chrominance averages MeanY and MeanC, respectively:

$$\begin{cases} T^Y = K_Y * MeanY \\ T^C = K_C * MeanC \end{cases} \quad (5)$$

Figure 13:
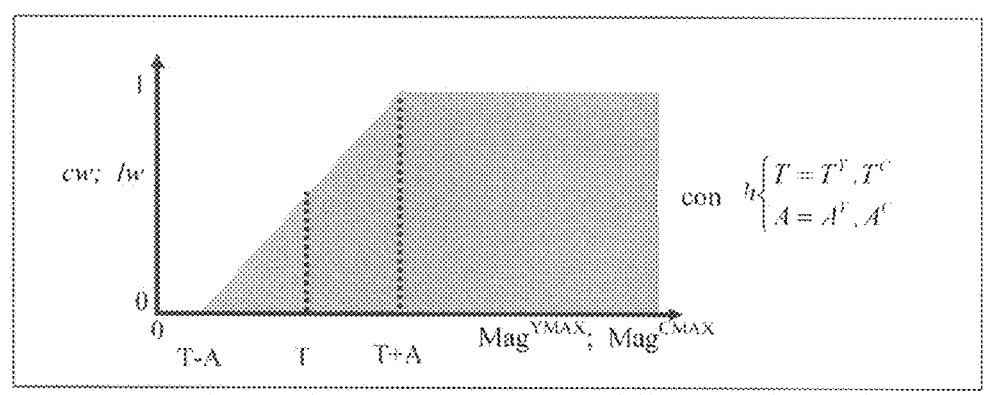
FIG. 13 is a graph of a membership function for the fuzzy variables cw and lw.

In an embodiment, the trapezoidal membership function of the two auxiliary fuzzy variables $cw_{i,j}$ and $lw_{i,j}$ is defined as shown in FIG. 13, wherein:

$$\begin{cases} T^Y = K_Y * FI * MeanY \\ A^Y = T^Y/20 \\ T^C = K_C * FI * MeanC \\ A^C = T^C/20 \end{cases} \quad (6)$$

In an embodiment, the described method is executed on all pixels of the image. Indeed, besides correcting the undesired color blurring effects, the method of this invention surprisingly reduces also chromatic artifacts such as aliasing, blocking, noise, without introducing any kind of artifact, independently from eventual subsampling and from quantization.

With the method of an embodiment it is possible to reduce or eliminate color bleedings without preventively discriminating blocks that are potentially affected or not affected by color bleeding. If it is too onerous to carry out the method on all image blocks, it is possible to select only some of the macroblocks that potentially can be affected by color bleeding, through the operations EDGE DETECTION and BLEEDING MB DETECTION illustrated in FIG. 6.

Tests carried out by the applicant showed that, if the method of an embodiment is used a discrimination among the various blocks is no longer a critical operation. As a matter of fact, with an embodiment of a method, considering a macroblock as potentially affected by color bleeding when it is not does not adversely affect the quality of the relative image portion.

The operation of edge detection EDGE DETECTION consists in locating all pixels of each macroblock in correspondence of which there are relatively large luminance and/or chrominance gradients.

As indicated in the following equations, $$Mark^Y(\text{pixel}) = \begin{cases} 1 & Mag^Y(\text{pixel}) > T^Y \\ 0 & \text{otherwise} \end{cases} \quad (7)$$

$$Mark^C(\text{pixel}) = \begin{cases} 1 & \begin{array}{l} Mag^{Cr}(\text{pixel}) > T^C \text{ or} \\ Mag^{Cb}(\text{pixel}) > T^C \end{array} \\ 0 & \text{otherwise} \end{cases} \quad (8)$$

the gradients the squared amplitude of which exceeds a corresponding threshold, that in the example of equations (7) (8) are the already used thresholds $T^Y$ and $T^C$, are considered large. With equations (7) and (8), all pixels near borders (contours of objects of the scene) are located, because in presence of contours there are large gradients of luminance and/or chrominance.

If a macroblock contains at least a pixel located with the operation EDGE DETECTION, it is selected with the operation BLEEDING MB DETECTION. This operation, described by equations (7) and (8), locates a macroblock the pixels of which may be corrected with the algorithm illustrated above if a chrominance and/or luminance gradient exceeds the corresponding threshold, which may be pre-established.

Tests showed that relevant chrominance gradients are not always present where there are relevant luminance gradients. For this reason, macroblocks to be treated are preferably located only if they contain at least a pixel to which a relatively large chrominance gradient is associated.

Figure 10:
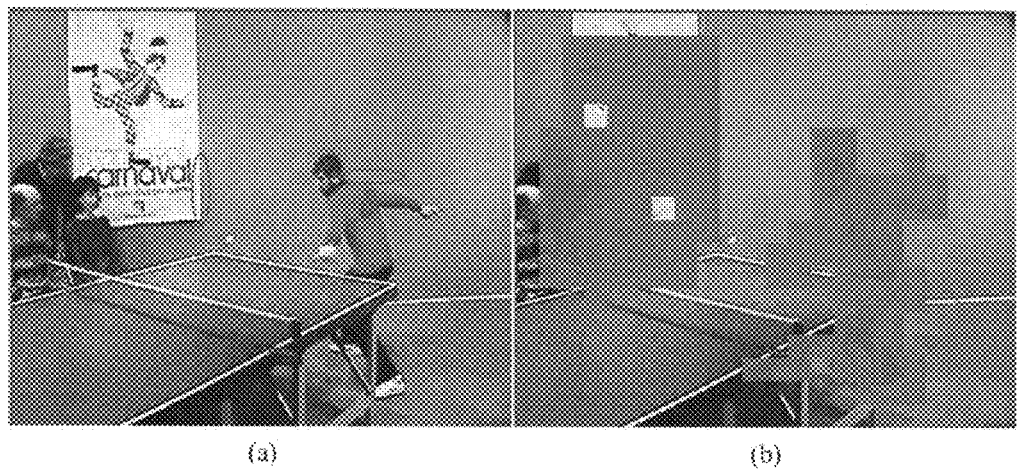
FIG. 10 depicts image blocks of FIG. 2a that could be affected by color bleeding.

FIG. 10a depicts an image affected by color bleeding, while FIG. 10b depicts the same image in which the blocks to be treated with the method of this invention, located with the EDGE DETECTION and BLEEDING MB DETECTION operations, are highlighted.

Embodiments of methods of this invention may be implemented both on static images and on images of a video sequence.

In an embodiment, as schematically indicated in FIG. 6, for speeding up the processing of an image of a video sequence, luminance and chrominance gradients are calculated by applying the Sobel filters on the image (t−1) that immediately precedes the currently processed image (t).

Tests carried out on different images produced optimal results both in terms of pleasantness of the corrected image and in terms of PSNR. FIGS. 14, 15, 16, 23, 24 and 25 compare static images or images of a sequence to be processed and the corresponding images processed according to the method of this invention.

FIGS. from 17 to 22 are diagrams that depict the relevant increment of the PSNR obtained with the method of this invention for the chrominance components.

The following Table 1 provides values of the PSNR for a set of tests of video sequences:

TABLE 1

| Sequence | kbit/s@ | PSNR Cr Component | | | PSNR Cb Component | | |
|---|---|---|---|---|---|---|---|
| (QP = 15) | 15fps | Decoded | Debleeded | Enhanced | Decoded | Debleeded | Enhanced |
| Cheers | 400 | 30.24 | 30.33 | 0.09 | 31.51 | 31.98 | 0.46 |
| Children | 189 | 30.366 | 30.72 | 0.06 | 31.23 | 31.37 | 0.14 |
| Foreman | 116 | 35.60 | 35.74 | 0.15 | 38.43 | 38.54 | 0.11 |
| kitchgrass | 156 | 37.11 | 37.37 | 0.26 | 37.59 | 37.78 | 0.19 |
| lab1 | 507 | 35.51 | 38.94 | 0.44 | 35.34 | 35.53 | 0.19 |
| lab2 | 493 | 36.67 | 36.97 | 0.30 | 37.07 | 37.56 | 0.49 |
| Paris | 122 | 31.68 | 31.96 | 0.29 | 31.65 | 31.89 | 0.24 |
| Renata | 314 | 36.59 | 36.83 | 0.25 | 36.44 | 36.63 | 0.19 |
| synthetic1 | 208 | 40.92 | 40.99 | 0.07 | 40.47 | 41.24 | 0.78 |
| synthetic2 | 536 | 35.66 | 36.00 | 0.34 | 36.12 | 36.64 | 0.51 |
| Table | 122 | 37.47 | 37.57 | 0.10 | 36.00 | 36.10 | 0.10 |
| Tempete | 293 | 32.85 | 33.02 | 0.17 | 35.28 | 35.72 | 0.44 |
| Weather | 114 | 29.25 | 29.29 | 0.04 | 29.83 | 31.30 | 1.47 |

The following Table 2 refers to static images:

TABLE 2

| Image | Size | PSNR Cr Component | | | PSNR Cb Component | | |
|---|---|---|---|---|---|---|---|
| 0.8 bpp | W × H | Decoded | Debleeded | Enhanced | Decoded | Debleeded | Enhanced |
| baboon | 512 × 512 | 29.35 | 29.46 | 0.11 | 30.04 | 30.21 | 0.18 |
| Fruits | 640 × 480 | 34.83 | 35.17 | 0.34 | 36.84 | 37.25 | 0.41 |
| Kodim1 | 768 × 512 | 39.95 | 40.30 | 0.35 | 40.94 | 41.41 | 0.47 |
| Kodim2 | 768 × 512 | 39.27 | 39.76 | 0.48 | 39.46 | 39.80 | 0.34 |
| Kodim3 | 768.512 | 39.91 | 40.13 | 0.22 | 41.64 | 41.72 | 0.09 |
| Kodim4 | 768 × 512 | 41.40 | 41.71 | 0.31 | 36.83 | 36.99 | 0.16 |
| Lena | 512 × 512 | 31.89 | 32.08 | 0.19 | 33.39 | 33.55 | 0.17 |
| macbeth | 640 × 480 | 37.29 | 38.41 | 1.13 | 38.17 | 39.02 | 0.86 |
| newspaper | 640 × 480 | 38.22 | 38.45 | 0.23 | 36.20 | 36.30 | 0.10 |
| Pool | 640 × 480 | 38.40 | 38.68 | 0.27 | 36.40 | 36.84 | 0.44 |

PSNR is relevantly increased.

The following Table 3 provides the numbers and the type of operations executed for implementing the algorithm of this invention.

TABLE 3

| Operation per pixel | LUMA (channel Y) | | | | | CHROMA (channels Cr and Cb) | | | | |
|---|---|---|---|---|---|---|---|---|---|---|
| | ADD | SHIFT | MUL | DIV | COMP | ADD | SHIFT | MUL | DIV | COMP |
| Mean Sobel Magnitude Calculation | 14 | 4 | 2 | 0 | 0 | 27 | 8 | 4 | 0 | 1 |
| Edges Detection | 0 | 0 | 0 | 0 | 4 | 0 | 0 | 0 | 0 | 3 |
| Bleeding MB Detection | 0 | 0 | 0 | 0 | 0 | 0 | 0 | 0 | 0 | 2 |
| Kernel Modulation | 0 | 0 | 0 | 0 | 0 | 168 | 0 | 48 | 50 | 145 |
| Activation Function | 0 | 0 | 0 | 0 | 0 | 6 | 0 | 4 | 2 | 5 |
| TOTAL | 14 | 4 | 2 | 0 | 4 | 201 | 8 | 56 | 52 | 156 |

Table 4 is similar to Table 3 but refers to the case of subsampled images 4:2:0.

TABLE 3

| Operation per pixel | ADD | SHIFT | MUL | DIV | COMP |
|---|---|---|---|---|---|
| TOTALE | 64.25 | 6 | 16 | 13 | 43 |

Embodiments of a method can be conveniently used with any compression algorithm for video sequences or static images that uses the discrete cosine transform (DCT) and whichever the type subsampling is used.

Embodiments of the systems and methods described herein may be implemented in a variety of ways, including as a combined system or as separate subsystems. Embodiments may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, separately described sub-modules may be combined.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
processing, using a processor, a digital image to reduce color bleeding effects in said image, comprising the step of generating two corrected chrominance components of a pixel to be corrected as a weighted mean of respective chrominance values of pixels of the image contained in a working window centered on the current pixel, wherein weights used in the weighted mean are determined for each pixel of the window different from the central pixel as a product between a first fuzzy variable and a second fuzzy variable,
the first fuzzy variable having values that decrease when a maximum difference between the chrominance components of the central pixel and of the considered pixel increase,
a value of the second fuzzy variable depending on an amplitude of a chrominance gradient calculated in correspondence of the central pixel; and
a weight corresponding to the central pixel being always one.

2. The method of claim 1, wherein values of the first and second fuzzy variables are determined by a decreasing linear function that is null only for values of said maximum difference and of said amplitude if the chrominance gradients are smaller than first and second threshold, respectively.

3. The method of claim 2, wherein said second threshold is proportional to an arithmetic mean on the whole image of maximum squares of the chrominance gradients.

4. The method of claim 2, wherein said first threshold equals a fraction of a maximum value that a pixel of the input image may assume.

5. The method of claim 1, wherein said chrominance gradient is obtained by using horizontal and vertical Sobel filters defined on said working window.

6. The method of claim 1, comprising the steps of:
generating final chrominance components for said current pixel through a second weighted mean of respective chrominance components of said pixel of the original image and of said corrected chrominance components, said corrected chrominance components being weighted with a one's complement of a weight for the chrominance components of said pixel of the original image, said weight being determined through the following steps:
defining a third fuzzy variable in function of a maximum squared amplitude of the gradients of the chrominance components in correspondence of the current pixel,
defining a fourth fuzzy variable in function of a squared amplitude of a luminance gradient in correspondence of the current pixel,
said weight being equal to a smallest of values of said third and fourth fuzzy variables in correspondence of the current pixel.

7. The method of claim 6, wherein said third and fourth fuzzy variables are defined by increasing membership functions equal to:
one, for values of the maximum square of amplitudes of the gradients of chrominance components and of the maximum amplitude of the luminance gradient larger than respective third and fourth thresholds;
zero, for values of the maximum square of amplitudes of the gradients of chrominance components and of the squared amplitude of the luminance gradient ($Mag^Y$) smaller than respective fifth and sixth thresholds.

8. The method of claim 7, wherein said membership functions are linear between said third threshold and said fifth threshold and between said fourth threshold and sixth threshold, respectively.

9. The method of claim 7, wherein:
mean values between the third and fifth thresholds and between the fourth and sixth thresholds are respectively proportional to an arithmetic mean on the whole image of the maximum squared chrominance gradients and to an arithmetic mean on the whole image of the square of the amplitude of the luminance gradient;
differences between the third and fifth thresholds and between the fourth and sixth thresholds are a fraction of the corresponding mean values.

10. The method of claim 1, comprising identifying blocks of pixels of said image that are potentially corrupted by color bleeding through the steps of:
calculating for each macroblock of said image to be processed a first arithmetic mean on the whole image of the maximum squares of the chrominance gradients and a second arithmetic mean on the whole image of the squared amplitude of the luminance gradient;
comparing the amplitude of chrominance and luminance gradients in correspondence of each pixel with respective seventh and eighth thresholds determined in function of said first and second arithmetic means;
judging the current block as a block potentially affected by color bleeding in function of the results of comparisons; and
applying steps to reducing color bleeding effects only on blocks potentially affected by color bleeding identified at the previous step.

11. The method of claim 10 wherein said seventh and eighth thresholds are proportional to said first and second arithmetic mean.

12. The method of claim 11, wherein said current macroblock is judged potentially affected by color bleeding if the amplitude of at least a chrominance gradient of any pixel of the macroblock exceeds the seventh threshold.

13. The method of claim 12, wherein said current macroblock is judged potentially affected by color bleeding if at the same time the amplitude of the chrominance gradient of any pixel of the macroblock exceeds the eighth threshold.

14. The method of claim 1 wherein the image is an image in a video sequence, comprising the step of calculating said chrominance gradients on an image of the video sequence that precedes the image to be processed.

15. A method, comprising:
identifying a working window around a selected pixel in a digital image;
determining a chrominance component for each pixel in the working window around the selected pixel;
assigning a weight to each pixel in the working window around the selected pixel based on a comparison of the determined chrominance components with a threshold;
selectively generating a corrected chrominance component of the selected pixel based on the determined chrominance components and the assigned weights; and
selectively adjusting the corrected chrominance component for the selected pixel based on a calculated chrominance magnitude of the selected pixel and the corrected chrominance component,
the identifying, the determining, the assigning, the generating and the adjusting being performed by one or more configured processing devices.

16. The method of claim 15 wherein determining the chrominance components comprises determining a maximum amplitude of a chrominance gradient.

17. The method of claim 15, further comprising determining the assigned weights based on a product of two fuzzy variables.

18. The method of claim 15 wherein assigning the weight to a pixel in the working window around the selected pixel comprises determining whether the pixel is part of an object associated with the selected pixel.

19. A device for processing a digital image, the device comprising:
an input configured to receive the digital image;
an output for outputting the processed digital image; and
one or more configured processing devices configured to implement:
a chrominance magnitude calculation module configured to generate chrominance components for a set of pixels in a working window in the digital image;
a kernel modulator configured to selectively assign weights to the pixels in the working window and to selectively generate a corrected chrominance component of a center pixel in the working window based on the generated chrominance components and the assigned weights; and
an activation module coupled to the kernel modulator and configured to selectively adjust the corrected chrominance component based on a calculated chrominance magnitude for the selected pixel and the corrected chrominance component.

20. The device of claim 19 wherein the kernel modulator is configured to determine the assigned weights based on a product of two fuzzy variables.

21. The device of claim 19 wherein the kernel module is configured to determine whether the pixels of the working window around the selected pixel are part of an object associated with the selected pixel.

22. The device of claim 19, further comprising:
an edges detector configured to compare pixel gradients with threshold gradients; and
a bleeding macro-block detection module configured to identify blocks of pixels for processing by the kernel modulator.

23. A device for processing a digital image, the device comprising:
an input configured to receive the digital image;
an output for outputting the processed digital image; and
one or more configured processing devices configured to implement:
a chrominance magnitude calculation module configured to generate chrominance components for a set of pixels in a working window in the digital image;
a kernel modulator configured to selectively assign weights to the pixels in the working window and to selectively generate a corrected chrominance component of a center pixel in the working window based on the generated chrominance components and the assigned weights;
an edges detector configured to compare pixel gradients with threshold gradients; and
a bleeding macro-block detection module configured to identify blocks of pixels for processing by the kernel modulator.

24. The device of claim 23 wherein the kernel modulator is configured to determine the assigned weights based on a product of two fuzzy variables.

25. The device of claim 23 wherein the kernel module is configured to determine whether the pixels of the working window around the selected pixel are part of an object associated with the selected pixel.

26. A system to process digital images, comprising:
an input configured to receive a digital image;
circuitry configured to implement:
means for calculating chrominance components of pixels in a working window in the digital image;
means for assigning weights to each pixel in the working window and generating a chrominance correction for a center pixel in the working window based on the calculated chrominance components and the assigned weights;
means for comparing pixel gradients with threshold gradients; and
means for detecting bleeding and identifying blocks of pixels for processing by the means for assigning weights and generating a chrominance correction; and
an output configured to output the processed digital image.

27. The system of claim 26, further comprising:
means for selectively adjusting the chrominance correction for the center pixel based on a calculated chrominance magnitude for the center pixel and the chrominance correction for the center pixel.

28. The system of claim 26, further comprising:
means for identifying blocks in the digital image for processing by the means for assigning weights and generating chrominance corrections.

29. The system of claim 26, further comprising means for acquiring a digital image coupled to the input.

30. A non-transitory computer-readable medium comprising program code that causes a computing device to implement a method that includes:
identifying a working window around a selected pixel in a digital image;
determining a chrominance component for each pixel in the working window around the selected pixel; and
selectively,
assigning a weight to each pixel in the working window around the selected pixel based on a comparison of the determined chrominance components with a threshold;
correcting a chrominance component for the selected pixel based on the determined chrominance components and the assigned weights; and
adjusting the corrected chrominance component based on a calculated chrominance magnitude for the selected pixel and the corrected chrominance component.

31. The non-transitory computer-readable medium of claim 30 wherein the method further includes determining the assigned weights based on a product of two fuzzy variables.

32. The non-transitory computer-readable medium of claim 30 wherein assigning the weight to a pixel in the working window around the selected pixel comprises determining whether the pixel is part of an object associated with the selected pixel.

33. The non-transitory computer-readable medium of claim 30, further comprising identifying blocks in the digital image for the selective assignment and adjusting.

34. The non-transitory computer-readable medium of claim 33 wherein identifying blocks in the digital images includes detecting edges by comparing pixel gradients with threshold gradients.

35. The non-transitory computer-readable medium of claim 30 wherein determining the chrominance components comprises determining a maximum amplitude of a chrominance gradient.

* * * * *